(12) United States Patent
Gabler et al.

(10) Patent No.: US 12,100,049 B2
(45) Date of Patent: Sep. 24, 2024

(54) FILTERED POS PROCESSING OF SERVICES

(71) Applicant: Solutran, LLC, Minneapolis, MN (US)

(72) Inventors: Joseph Harold Gabler, Excelsior, MN (US); Andrea Ruth Walstrom, Maple Grove, MN (US); Barry J. Nordstrand, Excelsior, MN (US)

(73) Assignee: Soltran, LLC, Minneapolis, MN (US)

( * ) Notice: Subject to any disclaimer, the term of this patent is extended or adjusted under 35 U.S.C. 154(b) by 0 days.

(21) Appl. No.: 17/341,361

(22) Filed: Jun. 7, 2021

(65) Prior Publication Data

US 2021/0383482 A1    Dec. 9, 2021

Related U.S. Application Data

(60) Provisional application No. 63/035,427, filed on Jun. 5, 2020.

(51) Int. Cl.
*G06Q 40/08*    (2012.01)
*G06Q 20/10*    (2012.01)

(52) U.S. Cl.
CPC .......... *G06Q 40/08* (2013.01); *G06Q 20/102* (2013.01)

(58) Field of Classification Search
CPC .................................................. G06Q 20/102
USPC .......................................................... 705/4
See application file for complete search history.

(56) References Cited

U.S. PATENT DOCUMENTS

| | | |
|---|---|---|
| 3,947,660 A | 3/1976 | Saito |
| 6,684,195 B1 | 1/2004 | Deaton et al. |
| 6,937,995 B1 | 8/2005 | Kepecs |
| 7,111,780 B2 | 9/2006 | Broussard et al. |
| 7,263,515 B1 | 8/2007 | Tenorio et al. |

(Continued)

FOREIGN PATENT DOCUMENTS

| | | | | |
|---|---|---|---|---|
| CA | 2905500 A1 | * | 9/2014 | ............. G06Q 40/08 |
| WO | 2009/145336 A1 | | 12/2009 | |
| WO | 2009/145366 A1 | | 12/2009 | |

OTHER PUBLICATIONS

Authors: David Sorokin et al : Title: Health Care Viewed through the Lens of Information; Publisher: MIT Press; Copyright year: 2016 (Year: 2016).*

(Continued)

*Primary Examiner* — Bruce I Ebersman
*Assistant Examiner* — Hatem M Ali
(74) *Attorney, Agent, or Firm* — Alston & Bird LLP

(57) ABSTRACT

A system and method are presented that utilizes a primary server having shadow data and benefit bucket data to provide adjudication and payment processing of insurance payment requests without requiring interaction with an insurance server and normal adjudication processes. The primary server can handle adjudication and payment processing for a plurality of insurance providers. An alternate payment method can be identified with a member identifier, allowing both insurance payment adjudication and member payment through the alternate payment method. The primary server can provide benefit processing for retail discounts, and store value benefits for authenticated purchase transactions. A variety of discounts, stored value benefits, insurance benefits, and alternate payment mechanisms can be incorporated into a single transaction and handled in real-time during the transaction.

5 Claims, 20 Drawing Sheets

(56) References Cited

U.S. PATENT DOCUMENTS

| | | |
|---|---|---|
| 7,877,289 B1 | 1/2011 | Cunningham et al. |
| 7,904,333 B1 | 3/2011 | Perkowski |
| 8,321,302 B2 | 11/2012 | Bauer et al. |
| 8,498,898 B1 | 7/2013 | Kogen et al. |
| 9,864,988 B2 | 1/2018 | Taylor et al. |
| 10,387,851 B1 | 8/2019 | Krajicek et al. |
| 11,030,701 B1* | 6/2021 | Brannan ............ G06F 16/9535 |
| 11,334,680 B1 | 5/2022 | Knox et al. |
| 2002/0040321 A1 | 4/2002 | Nicholson |
| 2002/0046116 A1 | 4/2002 | Hohle et al. |
| 2002/0049631 A1 | 4/2002 | Williams |
| 2002/0100808 A1 | 8/2002 | Norwood et al. |
| 2003/0046116 A1* | 3/2003 | Horowitz ............... G06Q 40/08 705/4 |
| 2003/0069839 A1* | 4/2003 | Whittington ........... G06Q 40/03 705/38 |
| 2003/0200144 A1 | 10/2003 | Antonucci et al. |
| 2003/0212595 A1 | 11/2003 | Antonucci |
| 2003/0216967 A1 | 11/2003 | Williams |
| 2004/0046116 A1* | 3/2004 | Schroeder ........... H01J 49/0086 250/296 |
| 2004/0054590 A1 | 3/2004 | Redford et al. |
| 2004/0140361 A1 | 7/2004 | Paul et al. |
| 2004/0148203 A1* | 7/2004 | Whitaker ............... G16H 10/65 705/35 |
| 2005/0071222 A1 | 3/2005 | Bigus et al. |
| 2005/0071225 A1 | 3/2005 | Bortolin et al. |
| 2005/0261968 A1 | 11/2005 | Randall et al. |
| 2005/0278216 A1 | 12/2005 | Graves |
| 2006/0015402 A1 | 1/2006 | Graves et al. |
| 2006/0053056 A1 | 3/2006 | Alspach-Goss et al. |
| 2006/0074784 A1 | 4/2006 | Brown |
| 2006/0095328 A1 | 5/2006 | Ross et al. |
| 2006/0113374 A1 | 6/2006 | Taylor et al. |
| 2006/0113376 A1 | 6/2006 | Reed et al. |
| 2006/0122855 A1 | 6/2006 | Prorock |
| 2006/0206435 A1 | 9/2006 | Hoblit et al. |
| 2007/0011044 A1 | 1/2007 | Hansen |
| 2007/0156531 A1 | 7/2007 | Schuller et al. |
| 2007/0164106 A1 | 7/2007 | McDevitt et al. |
| 2007/0175985 A1 | 8/2007 | Barnes et al. |
| 2007/0185803 A1 | 8/2007 | Harrison et al. |
| 2007/0244745 A1 | 10/2007 | Boal |
| 2007/0244811 A1 | 10/2007 | Tumminaro |
| 2007/0288313 A1 | 12/2007 | Brodson et al. |
| 2008/0033880 A1 | 2/2008 | Fiebiger et al. |
| 2008/0059306 A1 | 3/2008 | Fordyce et al. |
| 2008/0077498 A1 | 3/2008 | Ariff et al. |
| 2008/0097844 A1 | 4/2008 | Hsu et al. |
| 2008/0210753 A1 | 9/2008 | Plozay et al. |
| 2009/0018860 A1 | 1/2009 | Sikes et al. |
| 2009/0070251 A1 | 3/2009 | Gonen et al. |
| 2009/0099929 A1 | 4/2009 | Thibedeau et al. |
| 2009/0150234 A1 | 6/2009 | Darst et al. |
| 2009/0259589 A1 | 10/2009 | Agostino et al. |
| 2010/0010901 A1 | 1/2010 | Marshall et al. |
| 2010/0057554 A1 | 3/2010 | Lanford |
| 2010/0057611 A1 | 3/2010 | Antoo et al. |
| 2010/0088207 A1 | 4/2010 | McLaughlin et al. |
| 2010/0094733 A1 | 4/2010 | Shapira et al. |
| 2010/0100484 A1 | 4/2010 | Nguyen et al. |
| 2010/0131342 A1 | 5/2010 | Thibedeau et al. |
| 2010/0274659 A1 | 10/2010 | Antonucci et al. |
| 2010/0318372 A1 | 12/2010 | Band et al. |
| 2011/0015980 A1 | 1/2011 | Li |
| 2011/0078011 A1 | 3/2011 | Senghore et al. |
| 2011/0087592 A1 | 4/2011 | Van et al. |
| 2011/0239044 A1 | 9/2011 | Kumar et al. |
| 2011/0288918 A1 | 11/2011 | Cervenka et al. |
| 2011/0302020 A1 | 12/2011 | Ariff et al. |
| 2012/0012648 A1 | 1/2012 | Collins et al. |
| 2012/0016730 A1 | 1/2012 | Antonucci et al. |
| 2012/0030002 A1 | 2/2012 | Bous et al. |
| 2012/0066049 A1 | 3/2012 | Muthugopalakrishnan et al. |
| 2012/0123847 A1 | 5/2012 | Wane et al. |
| 2012/0136706 A1 | 5/2012 | Chang et al. |
| 2012/0150553 A1 | 6/2012 | Wade |
| 2012/0150668 A1 | 6/2012 | Wade |
| 2012/0150694 A1 | 6/2012 | Wade |
| 2012/0150697 A1 | 6/2012 | Wade |
| 2012/0150746 A1 | 6/2012 | Graham |
| 2012/0159746 A1 | 6/2012 | Matsumoto |
| 2012/0221468 A1 | 8/2012 | Kumnick et al. |
| 2012/0226534 A1 | 9/2012 | Aloni et al. |
| 2012/0233074 A1 | 9/2012 | Dangott et al. |
| 2012/0259742 A1 | 10/2012 | Ochiai |
| 2012/0310722 A1 | 12/2012 | Baron et al. |
| 2013/0103473 A1 | 4/2013 | Carpenter et al. |
| 2013/0110604 A1 | 5/2013 | Rooke et al. |
| 2013/0124429 A1 | 5/2013 | Zou et al. |
| 2013/0179250 A1 | 7/2013 | Nguyen et al. |
| 2013/0246094 A1 | 9/2013 | Cruise |
| 2013/0262249 A1 | 10/2013 | Beyer et al. |
| 2013/0338167 A1 | 12/2013 | Cai et al. |
| 2013/0339167 A1 | 12/2013 | Taylor et al. |
| 2013/0339238 A1 | 12/2013 | Unland et al. |
| 2014/0006126 A1 | 1/2014 | Mysen et al. |
| 2014/0019171 A1* | 1/2014 | Koziol .................. G06Q 40/08 705/4 |
| 2014/0188644 A1 | 7/2014 | Postrel |
| 2014/0214567 A1 | 7/2014 | Llach et al. |
| 2014/0324482 A1 | 10/2014 | Wallach |
| 2015/0120418 A1 | 4/2015 | Cervenka et al. |
| 2016/0078431 A1 | 3/2016 | Ramachandran et al. |
| 2016/0148244 A1 | 5/2016 | Nordstrand et al. |
| 2017/0076348 A1 | 3/2017 | Jennings et al. |
| 2020/0142930 A1 | 5/2020 | Wang et al. |
| 2020/0151754 A1 | 5/2020 | Nordstrand et al. |
| 2020/0151755 A1 | 5/2020 | Nordstrand et al. |
| 2020/0286117 A1 | 9/2020 | Nordstrand et al. |
| 2020/0286118 A1 | 9/2020 | Nordstrand et al. |
| 2020/0302471 A1 | 9/2020 | Nordstrand et al. |
| 2020/0302472 A1 | 9/2020 | Nordstrand et al. |
| 2020/0311751 A1 | 10/2020 | Shi et al. |
| 2022/0044274 A1 | 2/2022 | Nordstrand et al. |
| 2023/0055163 A1 | 2/2023 | Mccreight et al. |

OTHER PUBLICATIONS

Authors: Bahar Houtan et al: Title: A Survey on Blockchain-Based Self-Sovereign Patient Identity in Healthcare: Publisher: IEEE: pp. 90478-90494 Date of Publication: May 12, 2020 (Year: 2020).*

1. Authors: David Sorokin et al : Title: Health Care Viewed through the Lens of Information; Publisher: MIT Press; Copyright year: 2016 (Year: 2016) (Year: 2016).*

2. Authors: Bahar Houtan et al: Title: A Survey on Blockchain-Based Self-Sovereign Patient Identity in Healthcare: Publisher: IEEE: pp. 90478-90494 Date of Publication: May 12, 2020 (Year: 2020) (Year: 2020).*

Authors: David Sorokin et al : Title: Health Care Viewed through the Lens of Information; Publisher: MIT Press; Copyright year: 2016 (Year: 2016) (Year: 2016).*

Authors: Bahar Houtan et al: Title: A Survey on Blockchain-Based Self-Sovereign Patient Identity in Healthcare: Publisher: IEEE: pp. 90478-90494 Date of Publication: May 12, 2020 (Year: 2020) (Year: 2020).*

Final Office Action for U.S. Appl. No. 14/173,385, dated Dec. 11, 2014, (39 pages), United States Patent and Trademark Office, US.

Final Office Action for U.S. Appl. No. 14/173,385, dated Jun. 2, 2017, (26 pages), United States Patent and Trademark Office, US.

Final Office Action for U.S. Appl. No. 14/262,149, dated Aug. 19, 2015, (30 pages), United States Patent and Trademark Office, US.

Final Office Action for U.S. Appl. No. 14/262,149, dated Mar. 9, 2018, (41 pages), United States Patent and Trademark Office, US.

Final Office Action for U.S. Appl. No. 14/262,344, dated Jul. 8, 2015, (24 pages), United States Patent and Trademark Office, US.

Final Office Action for U.S. Appl. No. 15/008,787, dated Mar. 4, 2019, (36 pages), United States Patent and Trademark Office, US.

NonFinal Office Action for U.S. Appl. No. 13/446,743, dated Nov. 20, 2013, (13 pages), United States Patent and Trademark Office, US.

(56) References Cited

OTHER PUBLICATIONS

NonFinal Office Action for U.S. Appl. No. 13/835,372, dated Jan. 13, 2016, (30 pages), United States Patent and Trademark Office, US.
NonFinal Office Action for U.S. Appl. No. 14/173,360, dated Oct. 14, 2014, (16 pages), United States Patent and Trademark Office, US.
NonFinal Office Action for U.S. Appl. No. 14/173,385, dated Aug. 16, 2016, (31 pages), United States Patent and Trademark Office, US.
NonFinal Office Action for U.S. Appl. No. 14/173,385, dated Jul. 11, 2014, (28 pages), United States Patent and Trademark Office, US.
NonFinal Office Action for U.S. Appl. No. 14/262,149, dated Aug. 28, 2017, (36 pages), United States Patent and Trademark Office, US.
NonFinal Office Action for U.S. Appl. No. 14/262,149, dated Oct. 2, 2014, (21 pages), United States Patent and Trademark Office, US.
NonFinal Office Action for U.S. Appl. No. 14/262,344, dated Sep. 11, 2014, (21 pages), United States Patent and Trademark Office, US.
NonFinal Office Action for U.S. Appl. No. 14/715,264, dated Feb. 16, 2018, (24 pages), United States Patent and Trademark Office, US.
NonFinal Office Action for U.S. Appl. No. 14/939,158, dated Feb. 6, 2019, (20 pages), United States Patent and Trademark Office, US.
NonFinal Office Action for U.S. Appl. No. 15/008,787, dated Feb. 14, 2017, (35 pages), United States Patent and Trademark Office, US.
NonFinal Office Action for U.S. Appl. No. 15/726,455, dated Dec. 14, 2017, (36 pages), United States Patent and Trademark Office, US.
NonFinal Office Action for U.S. Appl. No. 15/834,176, dated Aug. 8, 2019, (23 pages), United States Patent and Trademark Office, US.
NonFinal Office Action for U.S. Appl. No. 16/746,883, dated Dec. 10, 2020, (7 pages), United States Patent and Trademark Office, US.
NonFinal Office Action for U.S. Appl. No. 16/746,884, dated Dec. 21, 2020, (6 pages), United States Patent and Trademark Office, US.
NonFinal Office Action for U.S. Appl. No. 16/776,752, dated Jan. 14, 2022, (27 pages), United States Patent and Trademark Office, US.
NonFinal Office Action for U.S. Appl. No. 16/881,655, dated Jun. 24, 2021, (26 pages), United States Patent and Trademark Office, US.
NonFinal Office Action for U.S. Appl. No. 16/882,493, dated Aug. 11, 2021, (11 pages), United States Patent and Trademark Office, US.
NonFinal Office Action for U.S. Appl. No. 16/895,913, dated Jun. 9, 2021, (8 pages), United States Patent and Trademark Office, US.
NonFinal Office Action for U.S. Appl. No. 16/897,645, dated Jul. 16, 2021, (14 pages), United States Patent and Trademark Office, US.
NonFinal Office Action for U.S. Appl. No. 17/314,271, dated Oct. 14, 2022, (12 pages), United States Patent and Trademark Office, US.
Zolotaryova, Iryna et al. "Example Of Developing A Loyalty Program Using CRM, SQL-Queries and Rapid Miner Tool," Proceedings of the Third International Conference on Modelling and Development of Intelligent Systems, Oct. 10-12, 2013, pp. 156-167, (12 pages), Lucian Blaga University, Sibiu, Romania.
Final Office Action for U.S. Appl. No. 17/961,162, dated Nov. 15, 1012, (28 pages), United States Patent and Trademark Office, US.
Non-Final Rejection Mailed on Apr. 9, 2024 for U.S. Appl. No. 18/067,526, 25 page(s).

\* cited by examiner

1400

1500

1800

1900

2000

2100

2200

2300

2400

2500

2600

2700

FILTERED POS PROCESSING OF SERVICES

CROSS-REFERENCE TO RELATED CASES

This application claims the benefit of U.S. Provisional Application No. 63/035,427, filed on Jun. 5, 2020. This application is also related to U.S. patent application Ser. No. 15/834,176, filed Dec. 7, 2017 (the '176 application). The '176 application was a continuation of U.S. patent application Ser. No. 14/173,385, filed Feb. 5, 2014, which was a continuation of U.S. patent application Ser. No. 13/835,372, filed Mar. 15, 2013, which in turn claimed the benefit of Provisional Application No. 61/763,462, filed Feb. 11, 2013. This application is also related to U.S. patent application Ser. No. 15/008,787 (filed Jan. 28, 2016), which is a continuation-in-part of U.S. patent application Ser. No. 14/262,148 (filed Apr. 25, 2014), which was itself a continuation-in-part of U.S. patent application Ser. No. 13/825,372 (identified also above). All of these related and priority applications are hereby incorporated by reference in their entireties.

FIELD OF THE INVENTION

This application relates to the field of server communications with diverse computerized systems. More particularly, the described embodiments relate to a system and method for multi-program redemption for substantiated service purchases, POS filtering, and insurance claim process made using a primary server.

DETAILED DESCRIPTION

System 10 and Related Data

Figure 1:
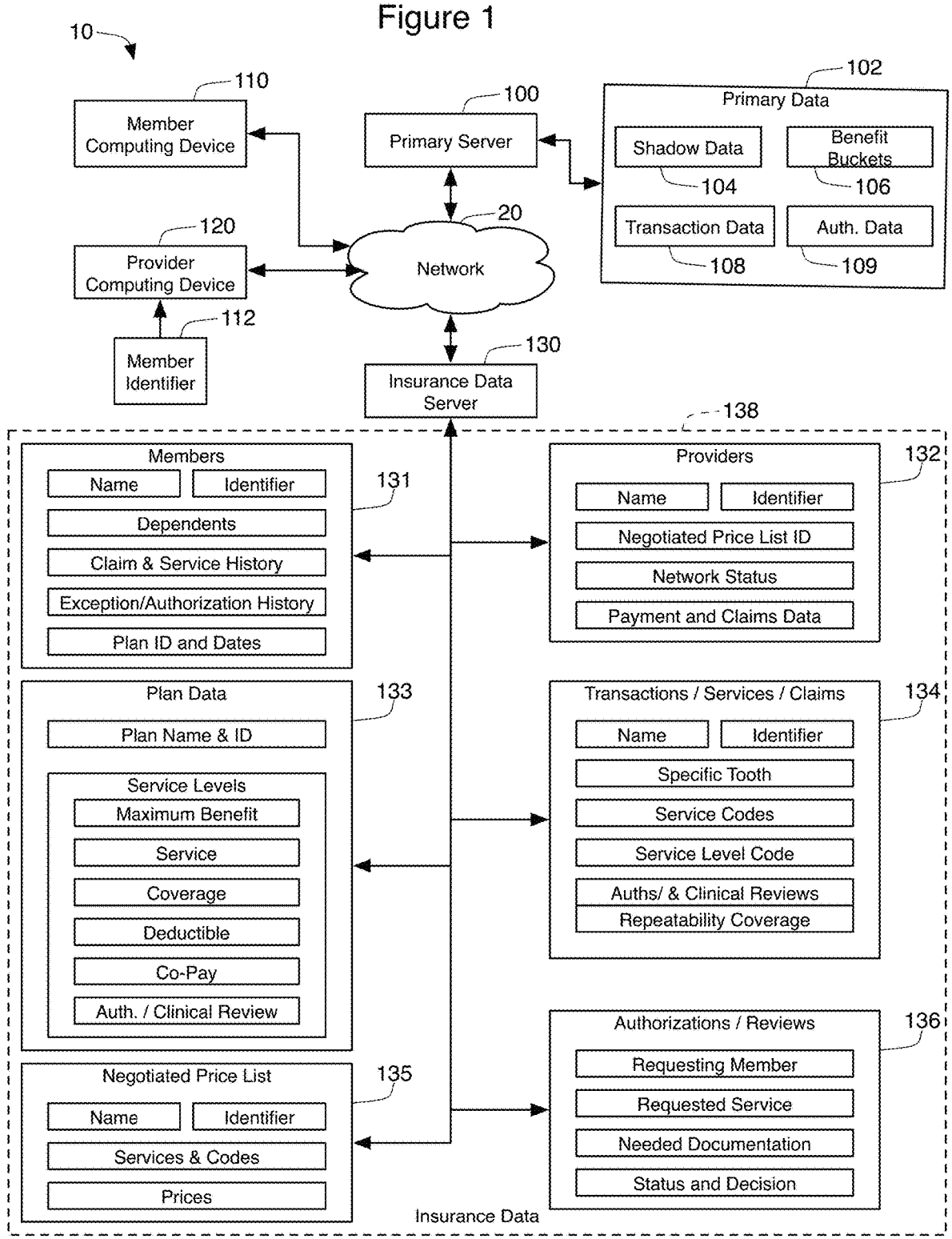
FIG. 1 is a schematic view of a system implementing the present invention.

FIG. 1 shows a system 10 in which server-based benefits relating to covered services can be provided. The system 10 relies upon a primary server 100 that connects to a variety of other computing devices over network 20. In one embodiment, the primary server 100 provides a layer of benefit processing for an insurance provider that runs an insurance data server (also known as the insurance server) 130. The insurance data server 130 maintains insurance data 138 for the insurance provider. In addition, the insurance server 130 is capable of handling claim processing for insurance claims.

In the embodiment of FIG. 1, the insurance server 130 provides dental insurance data 138 and processing for a dental insurance provider. The insurance server 130 stores, maintains, and updates a variety of data 131-136 relating to dental insurance. In particular, this data 138 includes member data 131 relating to the name and identifier of particular members. Members in this context are individuals that are the beneficiaries of the insurance provided by the insurance provider. The member data 131 also includes history data related to insurance claims made, services provided, and details about exceptions and authorizations that have been processed for the member.

The insurance server 130 also maintains provider data 132 that identifies individual providers of dental services. This data 132 includes the names and identifiers of the provider, their negotiated price list, their status in the insurance network (in network/out-of-network), and historical data about payment and claims.

Plan data 133 contains information about various insurance plans offered by the insurer. A single insurer might have multiple plans offered to differently situated individuals, or multiple plans that offer different benefit levels that may be selected by any given member. The plan data 133 describes the plans using a name and an identifier. In addition, each plan might have multiple service levels. The benefit provided by the insurance plan might vary depending on the length of time that the insurance is in force, the type of plan purchased by the insured, the type of service performed, and the provider of the service. The service level information in the plan data describes these requirements and insurance benefits, including coverages and limitations, maximum benefits over time periods, deductibles and co-pay requirements, and information concerning the percentage benefit provided in various situations.

Similarly, transaction or service data 134 contains information about services that are performed or are being requested for coverage. Each service that is submitted for coverage is associated with a particular member and a particular provider. The actual service being provided is associated with a service code, and (at least in the presently described context of dental insurance) is identified with a particular tooth of the member. The service may require pre-authorization or clinical review and may be subject to repeatability limitations. For instance, the dental insurance may place limits on the frequency with which a crown may be placed on a particular tooth. These limits on services are based upon the plan data 133, which each type of plan identified in the plan data 133 being associated with different authorization and clinical review requirements and repeatability coverage information for the same or similar service 134.

The negotiated price list information 135 defines the various prices agreed to upon by the providers for various services. The agreed upon prices for individual services can be grouped into price lists. Multiple price lists can co-exist in data 135. Each provider 132 is generally associated with a single price list.

Finally, pre-authorization and clinical review data 136 provides tracking and result information concerning authorizations and reviews performed by the claim processing staff and systems of the insurer. These reviews may occur before a procedure is performed in order for coverage to be provided (pre-authorization) or may occur after the procedure is performed (clinical review).

The primary server 100 transfers some of this data 131-136 into its own data store, namely primary data 102. This data can take the form of tables in a relational database, objects in an object-oriented data, or any other type of data store 102. In particular, the primary data tracks some of the information about members, providers, plans, accounts (linking members and plans), and exceptions and authorizations into shadow data 104. The shadow data 104 stored in the primary data store 102 is not a replacement for the definitive data 131-136 stored by the insurance provider. Rather, this shadow data 104 comprises data that changes only occasionally, and is transferred to the primary data 102 to allow the primary server 100 to handle a great number of claims made on behalf of members by a provider computing device 120 without requiring real-time interaction with the insurance server 130 and its data 131-136. The data in primary data 102 is generally acquired from the data 131-136 of the insurance server 130 through formal data queries or through application programming interfaces (APIs) provided by the insurance server 130.

The shadow data 104 can be considered to duplicate at least a portion of the insurance data 138. This "duplication" does not relate to the structure of the data or the database, but rather the content of the data. Thus, the insurance data 138 may take the form of a relational database using a certain table structure, and the shadow data 104 may comprise a different table structure or may be stored in data objects. These differences in structure are irrelevant.

Nor does all of the member data 134, provider data 132, and the price list data 135 from the insurance data 138 need to be duplicated in the shadow data 104. The primary server 100 may concern itself with only a portion of the members or a portion of the providers that utilize the insurance server 130.

A member that operates member computing device 110 will be associated with a member identifier 112. This identifier 112 can be provided to the member through an identification card, through digital communications, through a website login, or through an app operating on the member computing device 110. The member computing device 110 can take the form of a desktop or laptop computer, or a mobile device such as a smart phone or tablet computer.

The member can share their member identifier 112 with a service provider, which can read that identifier 112 on their provider computing device 120. Through this device 120, the provider can interact with the primary server 100 and request immediate or near immediate payment for services performed under the member's insurance policy.

The primary server 100 maintains for each member a plurality of benefit buckets 106 in the primary data 102. The number of different benefit buckets 106 maintained for each member, and the dollar value of each benefit bucket, are determined by the service levels in the plan data 133 defining the member's insurance plan. For example, an insurance plan might offer full payment for periodic maintenance services or dental cleanings (which may be defined as a category of service used to define benefits), but only one such service is allowed in each six-month period. The same plan might cover 65% of the costs for routine dental work (fillings), but with limits on multiple such services being performed on a single tooth within a time limit. Furthermore, the plan might cover 50% of the costs for major work (crowns), but with limits on per-tooth and total number limits within a two-year time period for this service category. In addition to the restrictions within each bucket 106, a plan may place a total cap (such as $1,000) on benefits in a given calendar year and may require co-pays that vary based on the bucket/type of service.

By tracking these restrictions on each bucket 106, and tracking transaction data 108 and authorization data 109 locally at the primary server 100 to identify past transactions, the primary server 100 can provide quick processing of most reimbursement requests from the provider computing device 120. In fact, by defining insurance benefits as benefit buckets 106, the primary server 100 is able to handle requests for insurance reimbursement from provider computing device 120 in the same manner as a promotion server handles promotion discount processing received from a point of sale system. Such a promotion server system is described in the related patent applications identified above. In this context, insurance claims could simply constitute another program in a processing system that handles promotion processing based on a filtered basket of purchased products from a retailer's point of sale system. Individual buckets of insurance benefits act like, and are treated similarly to, promotions in a discount or benefit program.

Figure 2:
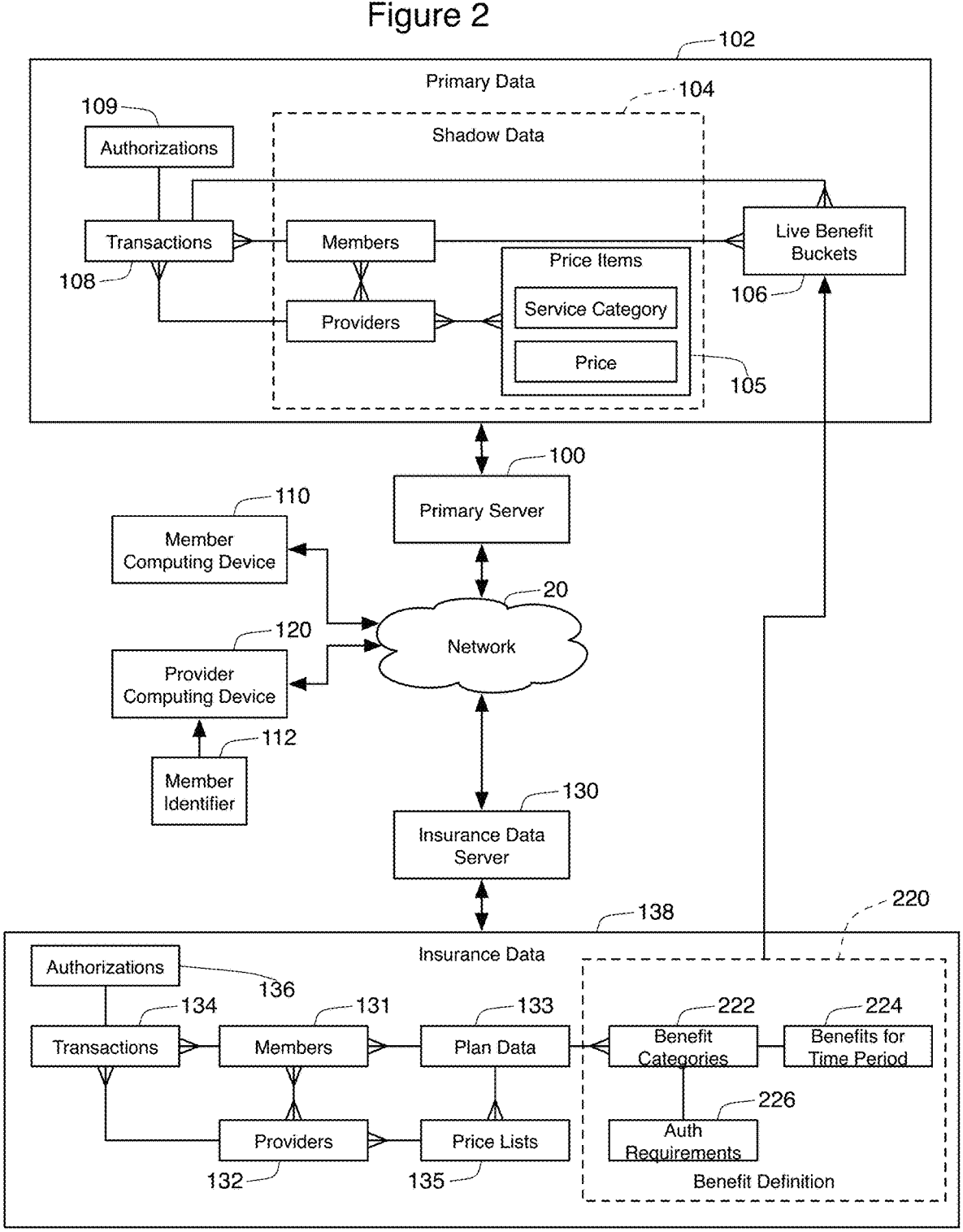
FIG. 2 is a schematic view of the system of FIG. 1 showing data details

FIG. 2 provides further information concerning the data maintained in system 10. In particular, this FIG. 2 shows that certain types of data are related to other types of data in the system. As explained above, the data itself can be stored in tables in a relational database, in objects in an object-oriented database, or as other types of data stores in a data storage system. The data shown in FIG. 2 is divided into separate "data elements," such as the member data elements 131 and the provider data elements 132. These elements might be instantiated objects, or rows on a table, or might be a combination of objects or related database tables. The use of the phrase "data elements" is to be taken to mean only that data of this type is maintained in the data stores/databases 102 and 138, not that a particular type of data needs to be distinctly defined within the database 102, 138.

In FIG. 2, the insurance data 138 shows that plans 133 defined in data 138 can be associated with a plurality of different members 131, meaning that each insurance plan can be purchased by multiple members. This one-to-many relationship is shown in the figure using crows-foot notation. Each member 131 can be acquiring services from a plurality of providers 132, and each provider 132 can service a plurality of members 131. A transaction 134 contains data for a service transaction between a member 131 and a provider 132. A particular transaction 134 may require an authorization 136 before payment is approved. Each plan 133 can be associated with one or more price lists 135, with each price list 135 being associated with a single provider 132.

The shadow data 104 contains information from the matters data elements 131 and the provider data elements 132, as well data extracted from the price list data elements 135. The data from the price lists 135 is shown as individual price items 105 to help clarify the content and role of the price lists. Each item 105 in the price list 135 identifies a particular price for a service category, such as a $1,000 total amount to be paid for a new crown.

The plan data 133 defines the benefits that a provided to members 131. As described above, the plan data 133 may define a plurality of benefits that have broken into benefit categories 222 by the plan data 133 (e.g., a new crown). For this category, benefits for a time period 224 are defined (e.g., 50% of the cost for a crown is covered, but with limits on per-tooth and total number limits within a two-year time period). Finally, authorization requirements 226 can be defined for this category. Together, this data 222, 224, 226 comprise a benefit definition 220 created by the plan data 133.

As shown in FIG. 2, this benefit definition 220 in the insurance data 138 is used (as indicated by the arrow in FIG. 2) to define and repopulate live benefit buckets 106 in the primary data 102. The benefit buckets 106 are associated with particular members, data for which are included in the shadow data 104 that was copied from the insurance data 138 to the primary data 102 for quick access. Note that the benefit definition 220 explains the amount of the benefit, the method for calculation of the benefit and the authorization prerequisites (pre-authorizations) or post-requisites (clinical review) for the benefit, but it does not track the amount of benefit used or remaining for a particular member 131. The total benefits and amount used for each benefit bucket are maintained in the live benefit buckets maintained by the primary server 100 in the primary data 102. The benefit bucket 106 for a category of service for a particular member, for instance, may indicate that $200 out of a $300 benefit bucket has been used during a calendar year, so only $100 of benefits is available for the user as part of a new transaction/service.

This would, of course, be subject to an overall benefit limit for the member in a given time frame. Thus, the primary server 100 will also maintain this overall limit, and be able to determine all benefits provided to a member within a time frame. The transaction data 108 in the primary data 102 allows the primary server 100 to track past usages in order to properly manage the various benefit buckets.

The transaction data 108 can be similar to the shadow data 104, in that it matches data found in the insurance data 138 (namely data element 134). The shadow data 104 is considered to be rarely changing data, and therefore is copied or updated from the insurance data 138 to the primary data on a periodic basis (such as daily) or on the occurrence of an event (like adding or removing an authorized member 131 or provider 132 from the insurance data 138). Unlike the shadow data 104, however, the transaction data 108 can be generated at the primary server 100. Thus, a new transaction can be received from the primary server 100 (as described below), can be authorized and paid by the primary server 100 (again described below), and the transaction data 108 can be stored in the primary data 102 directly by the primary server 100. The primary server 100 can then inform the insurance server 130 of this transaction to update its transaction information 134.

Similarly, the primary server 100 is responsible for tracking the benefits available to the member at a given time in the live benefit buckets data 106. Because the live data is maintained by the primary server 100, faster transaction processing is possible when compared with storing and calculating live data by the insurance server 130 in its database 138. Nonetheless, the transaction data 134 received by the insurance server 130 will include information about benefits provided for the transaction, allowing the insurance server 130 to have complete information about all transactions and benefits provided.

Some transactions require pre-authorizations and/or clinical reviews by the insurance provider. A benefit bucket 106 will identify authorization requirement 226 defined for the benefit category 222 for that bucket. This authorization requirement 226 may require a delay in the payment of a benefit for a transaction until the authorization is received. The insurance server 130 may have its own process for requesting authorizations and clinical reviews from qualified staff at the insurer. When a clinical review is completed, information concerning this review is stored in the authorization data element 136 in the insurance data 138. this information 138 is shared with the primary server 100 and is stored at the authorizations data element 109 in the primary data 102. At this point, the primary server 100 may provide benefit payment to the provider and record this payment against the live benefit bucket 106 identified with this transaction for that member.

Benefits Query Using System 10

Figure 3:
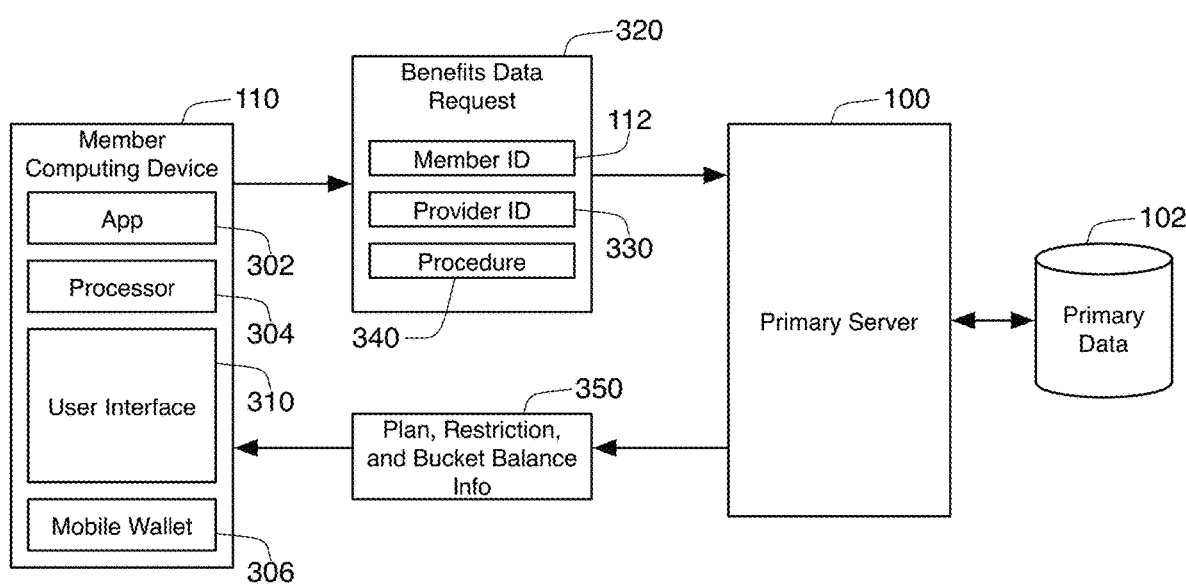
FIG. 3 is a schematic view showing data flows related to status inquiries.

FIG. 3 shows a communication between a member computing device 110 and the primary server 100. In FIG. 3, the member computing device 110 is shown with application programming (an app) 302 that runs on a processor 304, with the app 302 providing a user interface 310 on a display screen of the device 110. Through this user interface 310, a user can choose to look at the current status of their benefits.

Upon a request to see such data, the app 302 in the member computing device 110 will send a benefits data request 320 to the primary server 100. This communication will include a member identifier 112 so as to identify the member making the request 300. The communication 320 also includes a provider identifier 330 and information 340 identifying a particular procedure or service. The primary server 100 receives this data request 320, identifies the member, and then queries its primary data 102 in order to gather the relevant benefit bucket 106 for the member based on the identified procedure 340. Alternatively, a general benefits data request 320 can be made that requests information about all benefits remaining to the user. In this case, all relevant benefit buckets 106 for the member are gathered. To the extent separate buckets have separate benefit caps, the primary server 100 can identify the remaining amounts for each bucket. Similarly, the primary server 100 can identify the overall usage and amount remaining in overall benefits for the member. To the extent that restrictions from the plan will limit the member's ability to use her benefits, this information can also be identified through the primary data 102. The gathered data 350 is then transmitted back to the member computing device 110. The member computing device 110 is then able to present over its user interface immediate knowledge concerning remaining benefits to the member. When the benefits data request 320 includes a specific service identifier 340 (which would occur, for example, if the member wishes to know the benefits that would be provided if a tooth were to be extracted, or a crown were placed on a tooth), the returned data 350 would include only data relevant to that service.

In most cases, the benefits provided will vary depending upon the provider that is chosen by the member. If the provider is "in network," more generous benefits would be provided, while an "out of network" provider would be eligible for less generous benefits. Because of this, one embodiment of the user interface provides this type of benefits data shown in FIG. 2 only in relationship to a particular provider. In this case, the provider identifier 330 must be included in the benefits data request 300.

Figure 14:
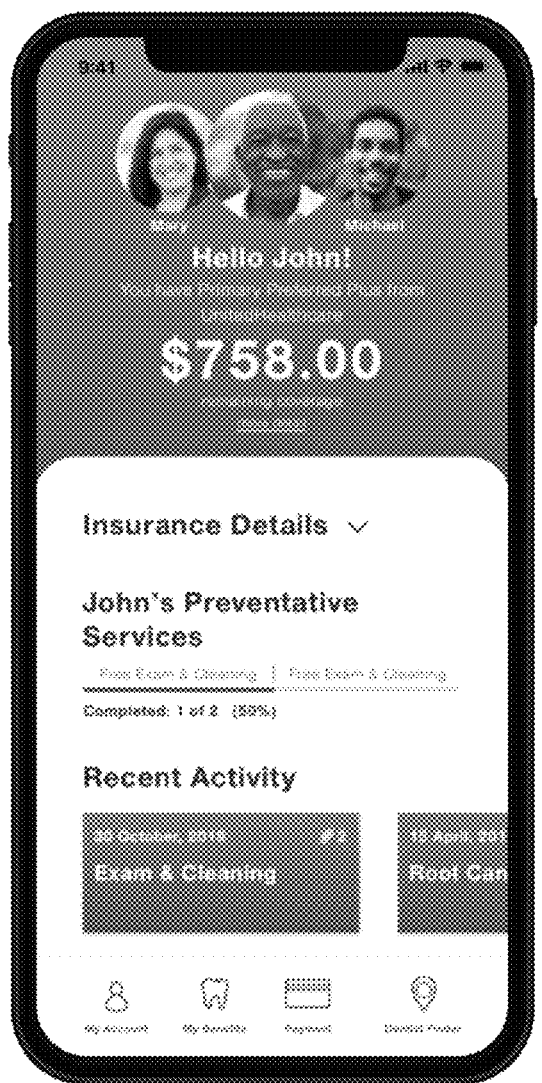
FIG. 14 shows a user interface 1400 for one embodiment of the present invention.
Figure 15:
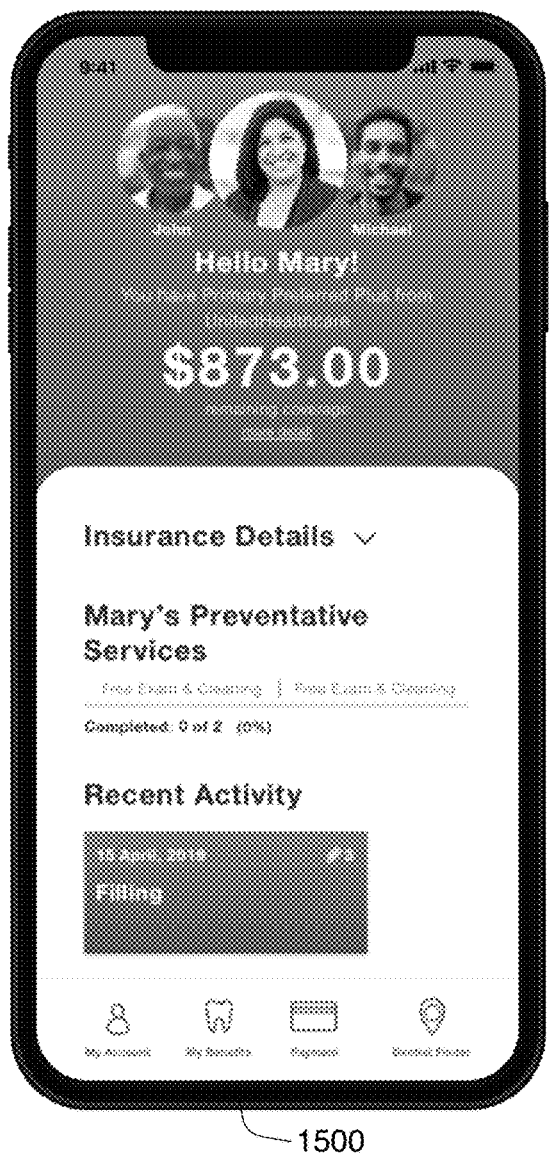
FIG. 15 shows a user interface 1500 for one embodiment of the present invention.
Figure 16:
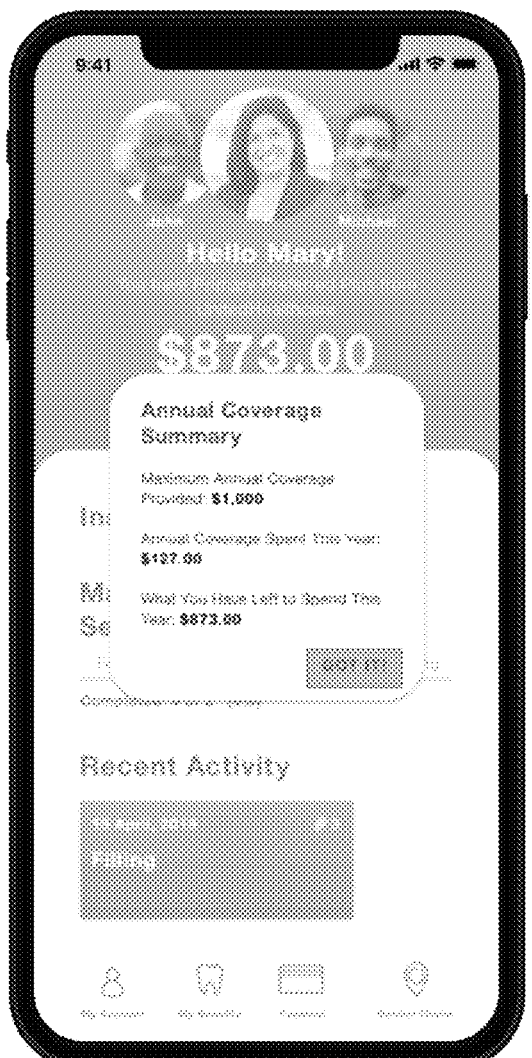
FIG. 16 shows a user interface 1600 for one embodiment of the present invention.
Figure 17:
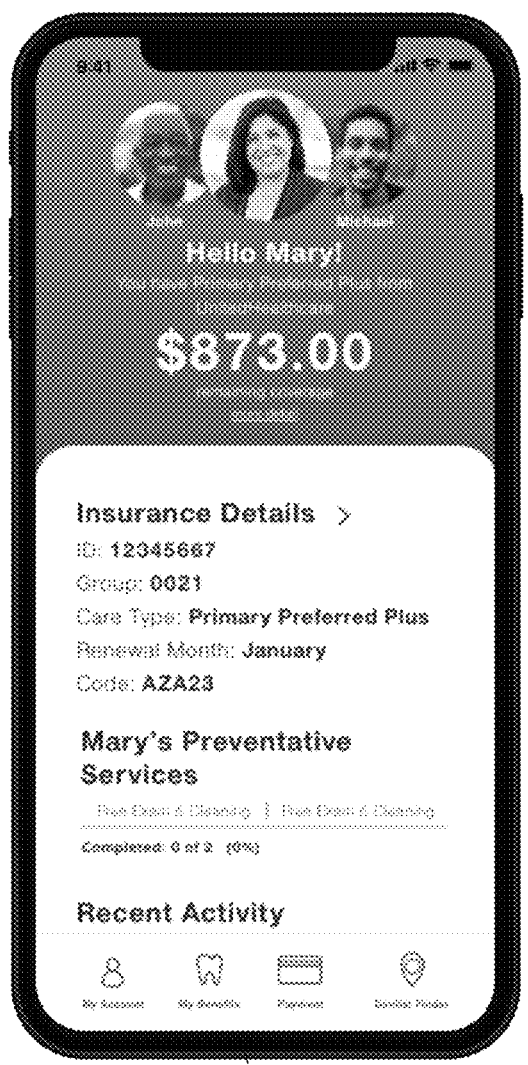
FIG. 17 shows a user interface 1700 for one embodiment of the present invention.

FIGS. 14 through 27 show user interfaces provided to a member computing device 110 in one embodiment of the present invention. FIG. 14 shows a primary screen interface 1400 for John, including the $758 dollars of benefits remaining the total yearly cap for this member. This interface 1400 provides the ability for John to see recent activities (such as a recent exam & cleaning), and for John to immediately see his remaining benefits for these types of preventative services. In FIG. 14, John has completed one of his two free exams & cleaning in this yearly period.

Other members of John's family are shown at the top of the interface of FIG. 14. The member may select Mary, and interface 1500 of FIG. 15 will appear showing Mary's benefits, the amount remaining in her yearly cap and her recent activities and remaining preventative services. More information about her remaining coverage can requested, resulting in the display of interface 1600 (FIG. 16) and a description of the annual coverage limits and benefits remaining to Mary. The determination of amounts remaining can occur through the process shown in FIG. 3. In addition, Mary may ask for information about her insurance using the same app, with the insurance details interface 1700 being shown in FIG. 17.

Figure 18:
FIG. 18 shows a user interface 1800 for one embodiment of the present invention.
Figure 19:
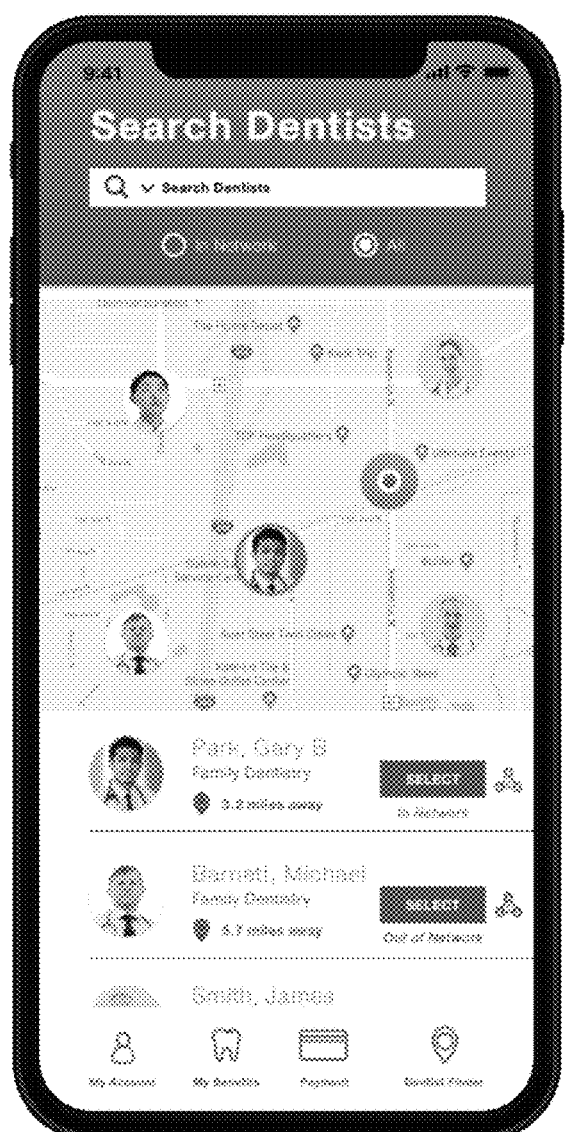
FIG. 19 shows a user interface 1900 for one embodiment of the present invention.
Figure 20:
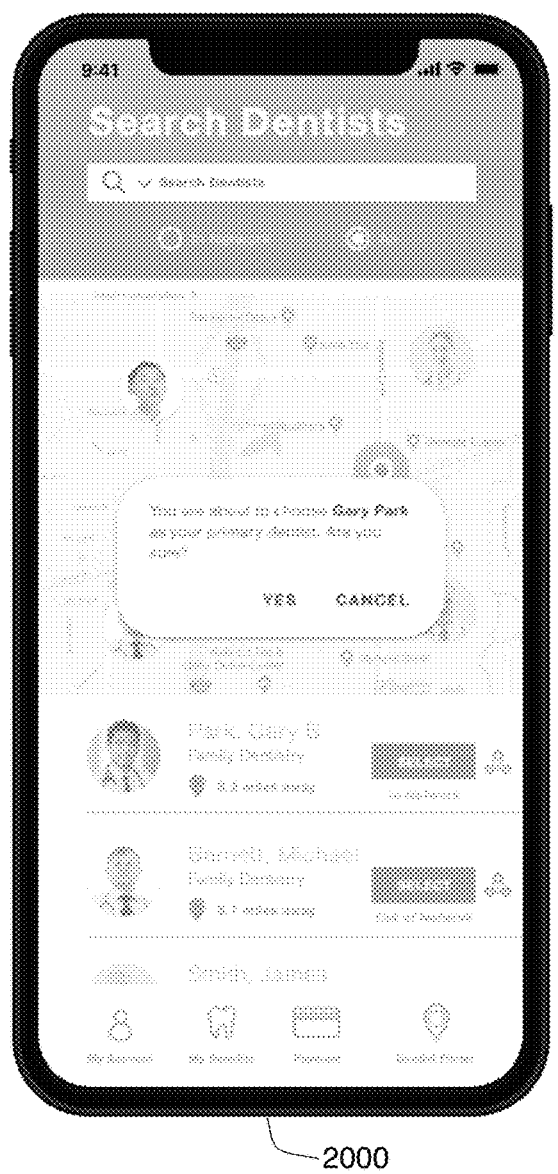
FIG. 20 shows a user interface 2000 for one embodiment of the present invention.
Figure 21:
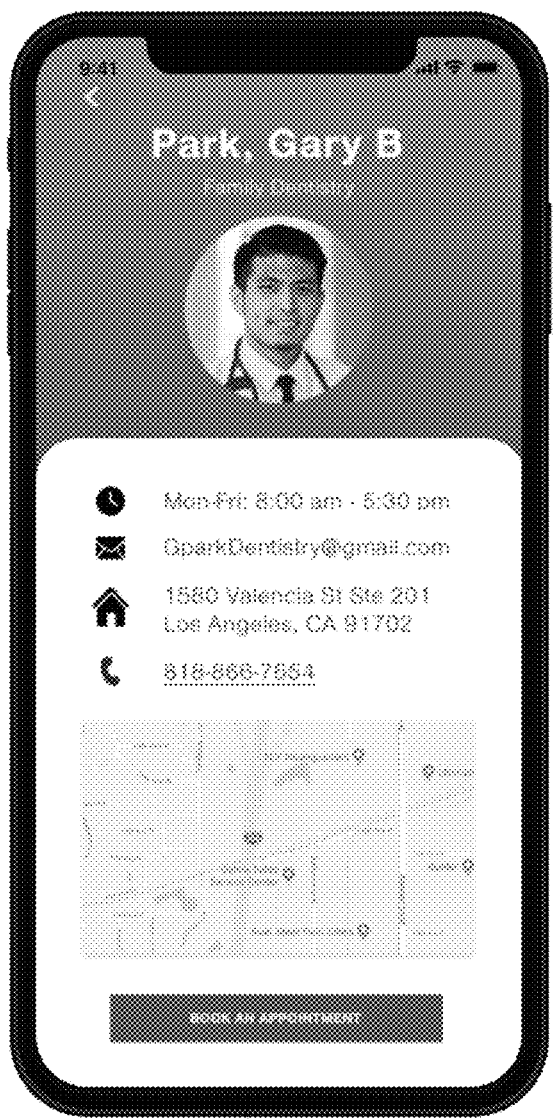
FIG. 21 shows a user interface 2100 for one embodiment of the present invention.

As explained above, the actual benefits provided for a service will typically depend on the provider selected by the member. In FIG. 18, an interface 1800 is provided that presents general information about the insurance plan coverage when no provider (dentist) has been chosen by the member. The app can allow a member to search for a dentist if they do not have one. If they elect to do so, a map and list of available dentists can be provided, as shown in interface 1900 of FIG. 19. The list indicates which dentists are in network, and which ones are out of network, reminding the member that greater coverage provided will be given for providers that are in network. In FIG. 20, a confirmation interface 2000 is presented requiring confirmation before a provider is selected for the member. Of course, the provider could be selected without the general search shown in FIG. 19 by simply searching for an already known provider. Specific information can be provided about a provider as shown in interface 2100 of FIG. 21, including their location, hours, and contact information. In some embodiments, the app can help the member book an appointment with the provider.

Figure 22:
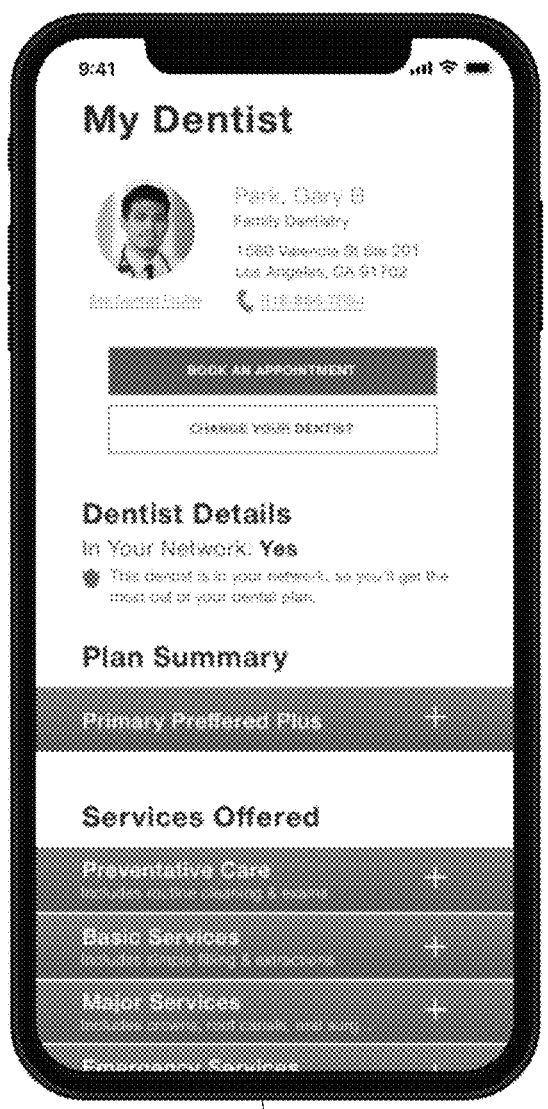
FIG. 22 shows a user interface 2200 for one embodiment of the present invention.
Figure 23:
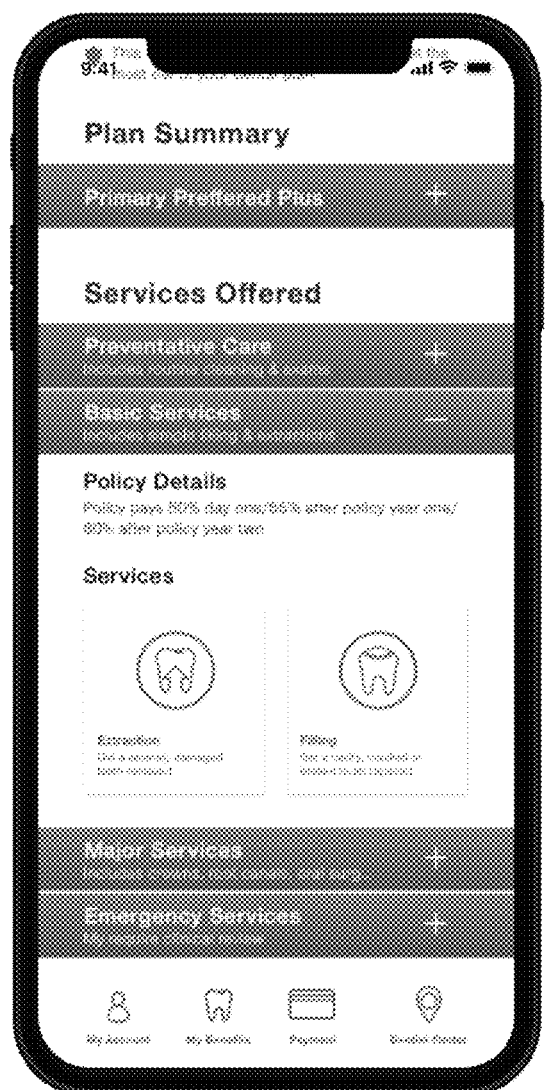
FIG. 23 shows a user interface 2300 for one embodiment of the present invention.

As shown in interface 2200 of FIG. 22, once a particular provider is selected, more information about coverage can be provided to the member. As shown in FIG. 3, a member computing device 110 can include information about both a specific provider and a specific procedure or service in the benefits data request 320. This allows the primary server 100 to provide specific information about the costs and coverage for that procedure. For example, the member may wish to know about the coverage provided for a tooth extraction. This is a type of basic service, so the "Basic Services" bar in interface 2200 can be selected resulting in the interface 2300 shown in FIG. 23. Two types of basic services are shown in that figure, namely tooth extraction and filling. To obtain coverage information, the member computing device can identify the member, the provider, and the procedure (tooth extraction) in the benefits data request 320. The primary server 100 can consult the primary data 102 without having to rely upon querying the insurance server 130. The primary data 102 will contain information about the provider, including their network status and the price list 135 which they have agreed to with the insurance provider. Based on this information, and the information in the benefits buckets associated with the member, the primary server 100 can return the appropriate benefits information 350 to the member computing device 110. This results in an interface 2400 such as that shown in FIG. 24. The overall cost of the procedure based on the negotiated price list 135 is presented. The benefit provided by the insurance provider is also presented ($250). This value is based upon both the contractual terms of the insurance (50% coverage for these types of services during this period of the policy's life) and also upon remaining amounts in the benefit buckets of the member. If the member is approaching their total yearly benefit cap, the amount covered could be reduced to the amount remaining in that cap.

Transaction Processing Using System 10

Figure 4:
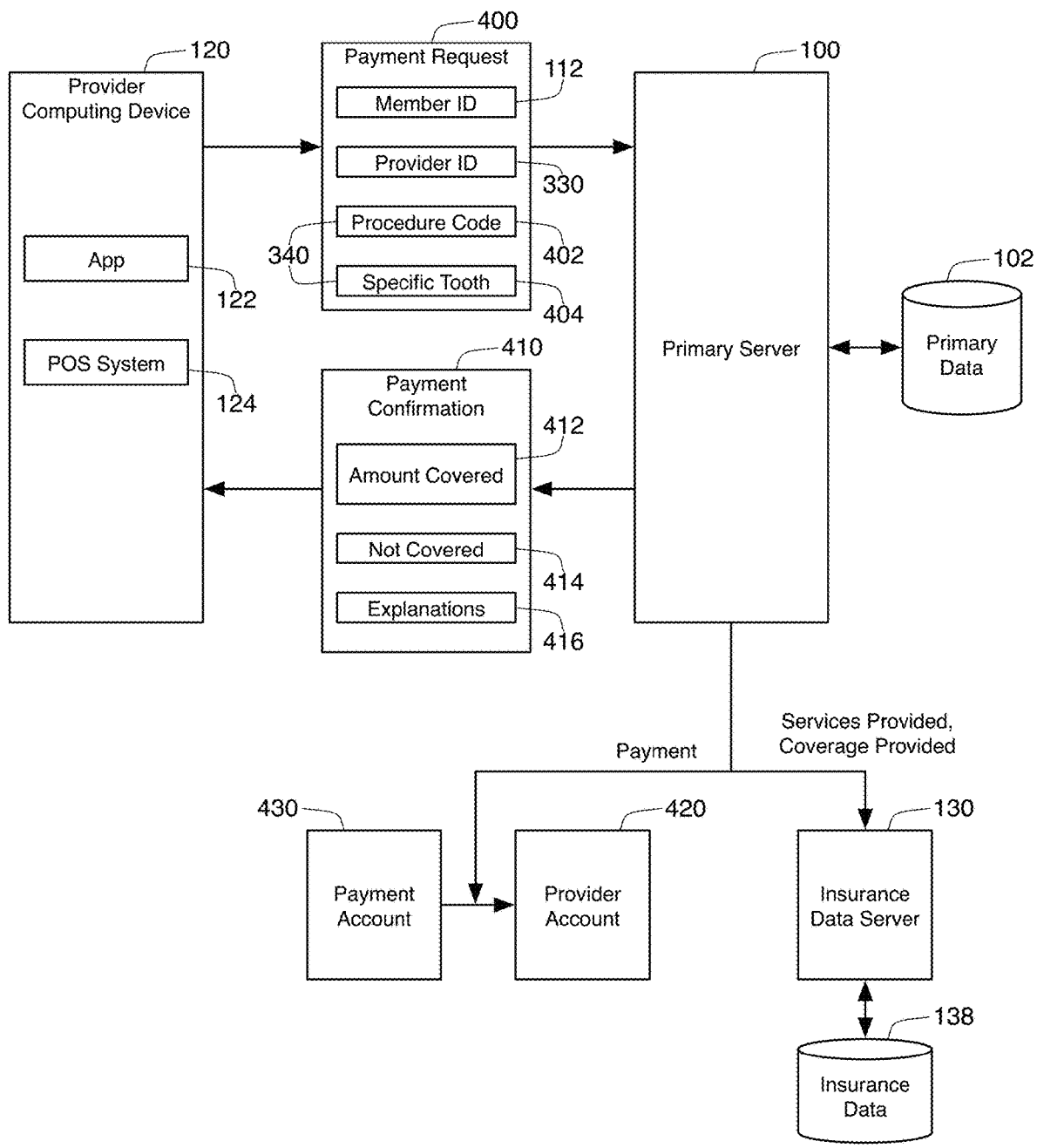
FIG. 4 is a schematic view showing data flows relating to payment requests.

The system 10 also provides for near real-time payment for procedures performed by the providers. In FIG. 4, it is shown that a provider computing device 120 can submit a payment request 400 to the primary server 100. Like the benefits data request 320, the payment request 400 contains the member ID 112 and the provider identifier 330, and also identifies the procedure 340 that has been performed. As explained above, some benefits may be restricted by tooth (e.g., a benefit to pay for a crown is provided only every other year for a specific tooth). Thus, the information identifying the procedure 340 can include both a specific procedure category or code 402 (e.g., a new crown) and the specific tooth (or teeth) identifier 404 upon which the procedure was performed. The primary server 100 uses that data to query the primary data 102 in order to determine a payment amount for the provider and the benefits available to the member for this service. This determination is made without having to access the insurance data 138 maintained by the insurance server 130, as the primary data 102 will be sufficient to make this determination.

Figure 24:
FIG. 24 shows a user interface 2400 for one embodiment of the present invention.
Figure 25:
FIG. 25 shows a user interface 2500 for one embodiment of the present invention.

The member identifier 112 submitted in the benefits data request 320 may be found on a physical card that the member presents to the provider. In other circumstances, the app 302 operating on the member computing device 110 will display that identifier 112 over user interface 310. In FIG. 24, a convenient "Go to payment now" button is provided. If selected, the interface 2500 of FIG. 25 is provided. This interface can also be reached by pressing the "Payment" icon on the bottom of most screens in the user interface. As shown in FIG. 25, a visual representation of an identification card is shown with a readable version of the member identifier 112. In addition, a scannable bar code is presented that can be scanned using an image scanner attached to the provider computing device 120.

Once the primary server 100 determines the amount of compensation that the insurer will provide to the provider for performing the procedure, the payment confirmation communication 410 is transmitted to the provider computing device 120. This communication 410 includes the amount covered (aka, the payment amount) 412 as well as the amount that remains uncovered 414. The remaining amount is determined simply by taking the agreed upon price for the procedure in the negotiated price list 135 and subtracting the payment amount 412. As explained below, some embodiments utilize an alternate payment mechanism to provide a process for paying the uncovered amount 414 directly to the provider. In these embodiments, the payment confirmation 410 would include this additional payment amount and would reduce the not covered amount 414 by the amount of this additional payment.

Explanations 416 can also be provided in the payment confirmation notification 410 that explain how the payment amount was calculated and any limitations that might have affected this amount. These limitations may include the percentage covered under the policy (frequently less than 100%), co-pays, yearly policy limits, frequency limits, and per-tooth limits.

The primary server 100 is also responsible for making a payment to the provider based upon the calculated amount covered. In the preferred embodiment, every provider using the system 10 will identify a provider account 420 to the primary server 100. This provider account 420 will receive payments of the amount covered through an ACH banking transaction. The primary server 100 is responsible for making payments from a payment account 430 that it manages to the provider account 420. In some embodiments, the payment account 430 is funded by the insurance provider in order for the payments to be made.

In addition, the primary server 100 will communicate directly with the insurance server 130 to indicate that services have been provided by the provider, and that payment has been made to the provider account 420 from the payment account 430. The insurance server 130 can then record this information in the insurance data 138.

Multiple Program System 500

Figure 5:
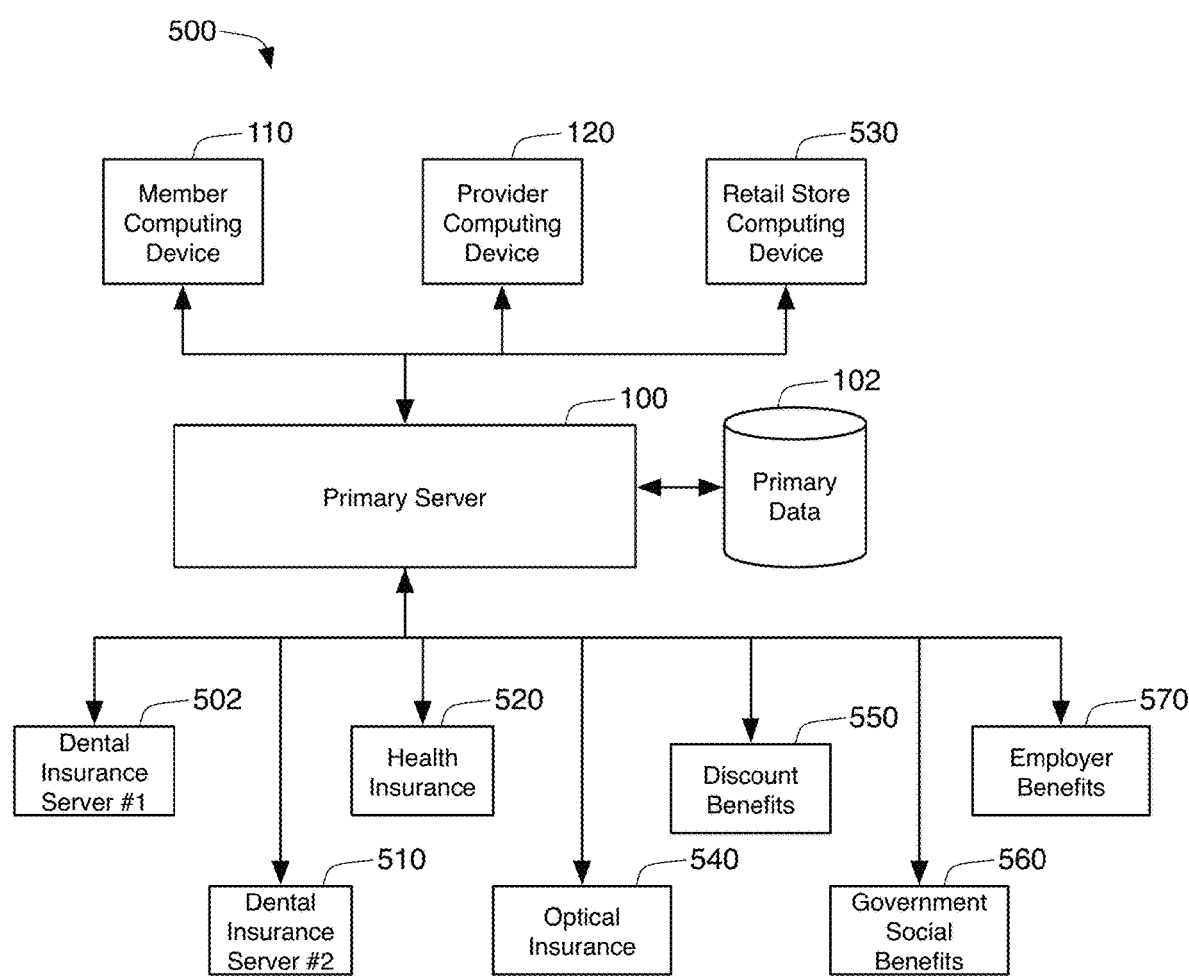
FIG. 5 is a schematic view showing the layering of the primary server over a variety of benefits provided to a member computing device.

FIG. 5 shows a system 500 in which the primary server 100 and its primary data 102 operate multiple programs that provide different types of benefits and services. As explained above, the primary server 100 can interact with an insurance server 130 to provide insurance benefits. In FIG. 5, insurance server 130 could take the form of dental insurance server #1 502. The primary server 100 also interacts with a member using the member computing device 110 and a provider using the provider computing device 120. Although the dental insurance server 130 can provide multiple different policies and multiple different services and service levels in the policies, server 502 will generally handle the insurance processing and records for only a single insurance provider, which may be a single insurance company or a plurality of jointly owned sister insurance companies. Because the primary server 100 acquires data from the dental insurer 502 and holds it its own primary data 102, it has created a processing layer on top of the traditional computing processing that is provided for an insurance company by server 502. At this higher layer, the primary server 100 can easily provide the same benefits and processing for a second insurance provider of the same type (such as dental insurance) and its server 510. Using system 500, a single interface between the provider computing device 120 and the primary server 100 will provide processing for the provider for multiple (or all) of the insurance companies used by their patients.

In addition, the primary server 100 could provide the same type of processing and benefits for other types of insurance, including health insurance 520 and optical insurance 540. In each case, members will be able to use their own computing devices 110 to check on their benefits and to provide insurance information to their health providers, and the providers will be able to use provider computing devices 120 to interface with the primary server 100 for claims payments and processing.

Furthermore, a retail store computing device 530 (such as a point of sale device or a retail store system) can communicate with the primary server 100 to handle discount benefits 550. This process is explained in great detail in the incorporated patent applications. These patent applications explain how different programs can be created, with each program being associated with a plurality of different promotions. Each of these promotions provides benefits under a program. The promotions correspond to the different benefit buckets in the primary data 102 described above. Thus, the same system 500 can receive the same types of request 400 (containing a filtered list of purchased items as opposed to a list of provided services/procedures) from the retail store computing device 530, resulting in a communication 410 explaining the benefits provided along with payment to an account 420 associated with the retailer that operates device 530. The retail store computing device 530 can use the primary server 100 to access government social benefits 560 such as SNAP benefits. Finally, it might be possible to tap into employer-sponsored benefits 570 in which an employer contributes funds to its employees that can be spent on specific goods and services. These possibilities are described as a separate program in the same system (like system 500) in the incorporated applications.

Figure 6:
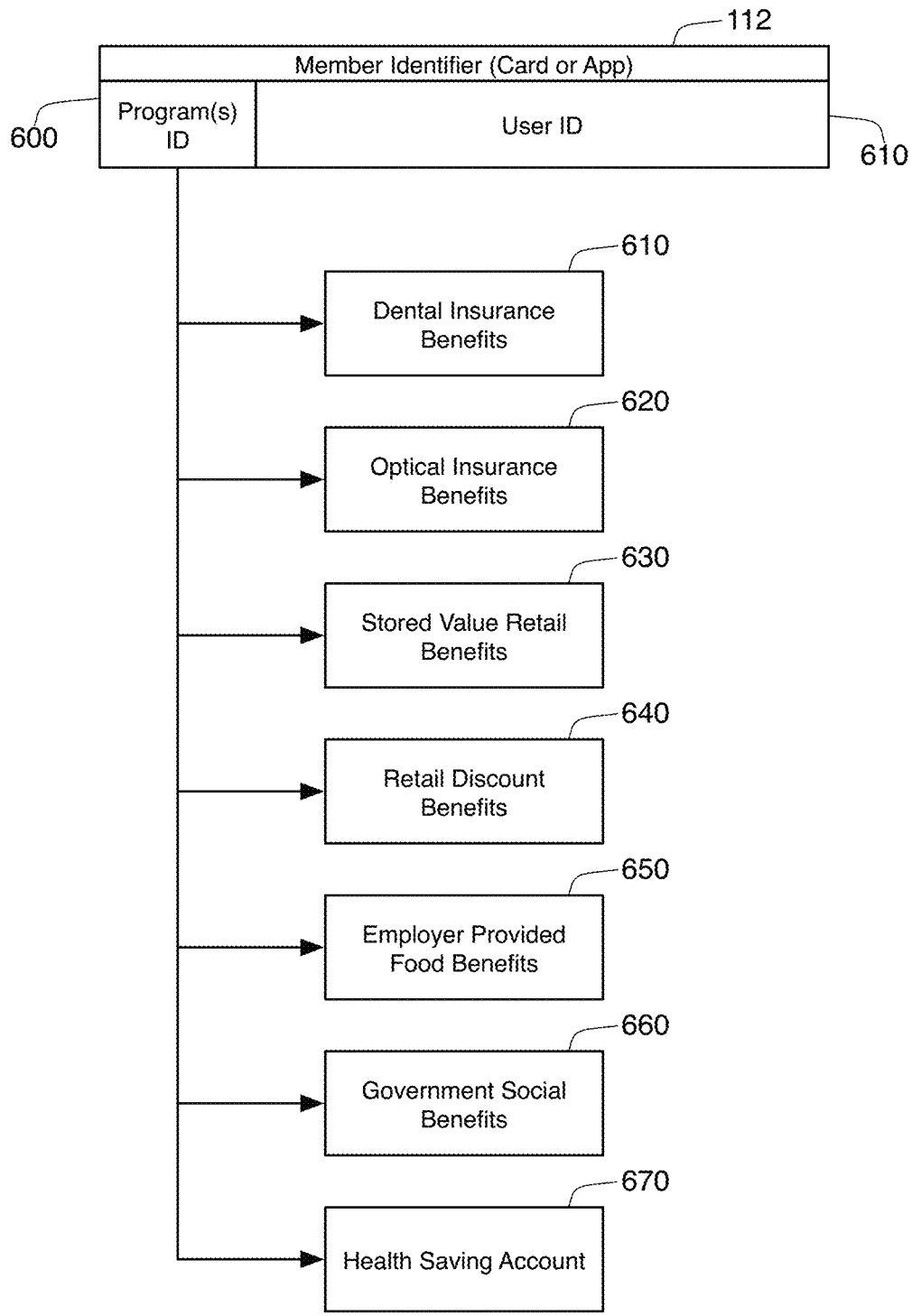
FIG. 6 is a schematic view showing the relationship of various programs in the system of the present invention and a program ID component in a member identifier.

FIG. 6 shows that a member identifier 112 can contain both a program ID 600 and a user ID 610. This is also described in the incorporated applications. The program ID 600 can indicate that a particular member is associated with a single program, such as the dental insurance benefits program 610. Alternatively, the program ID 600 can indicate that the member belongs to an optical insurance benefits program 620, a stored value retail benefits program 630, a retail discount benefits program 640, an employer provide food benefits program 650, a government social benefits program 660, or even a health savings account benefit program 670. Furthermore, a single program ID 600 can indicate that a user is associated with multiple such program 610-670.

In FIG. 6, it is contemplated that a portion of the member identifier 112 is dedicated to the program ID 600, while a separate portion is dedicated to the user ID 610. The member identifier 112 may be, for example, a 24 digit alphanumeric identifier, with a subset of digits set aside for the program identifier 600 and the remaining digits set aside for the user identifier 610. Alternatively, the entire member identifier 112 may be linked to a table in the primary data 102, wherein each member identifier 112 is linked to one or more programs 610-670. This table can, for each member identifier 112, list all of their associated programs 610-670. Thus, the member identifier 112 can link to a first identifier for the member's dental insurance benefit, a separate identifier for the member's government social benefits 660, and a third identifier for the member's health savings account 670. Alterations to a user's programs could therefore be made to this table in the primary data 102 without altering the user's member identifier 112.

Set-Up Method 700

Figure 7:
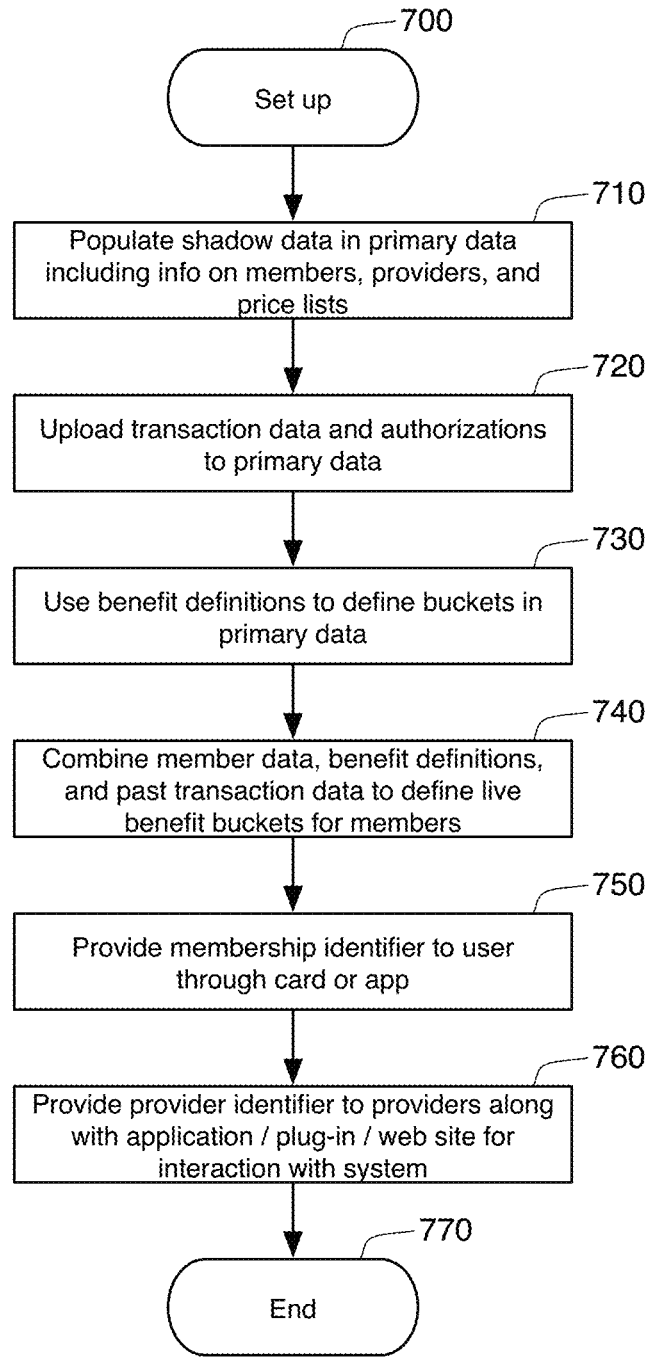
FIG. 7 is a flow diagram showing a set up method.

FIG. 7 shows a flow chart for a method 700 for setting up system 10 to allow for processing. The first step 710 of this method 700 is to populate the shadow data 104 in the primary data 102 used by the primary server 100. As explained above, this data can be obtained from the insurance data 138. In one embodiment, an API is called to the insurance server 130 by the primary server 100. This API call requests the data necessary for the shadow data 104, including at least the data relating to members 131, providers 132, and price lists 135, and which may include the plan data 133. At step 720, the transaction data 108 and the authorizations information 109 in the primary data are populated using the same or similar data 134, 136 respectively, in the insurance data 138.

At step 730, the benefit definition data 220 in the insurance data 138 can be used to define the benefit buckets 106 that will contain live data concerning the benefits available to members. As step 740, information about the members, prior transactions 108, and authorizations 109 are combined in order to populate the live benefit buckets 106 with data about the benefits that are available to each member in each benefit category (from data 222). This step 740 will also include the "refilling" of the benefit buckets 106 upon the renewal of the time period for each category (from data 224). Thus, if a certain amount of benefit is available for a particular category of service every calendar year, the benefit bucket 106 for that benefit category will "refill" to the full benefit amount every January $1^{st}$. This renewal can be triggered by the insurance server 130 via a communication to the primary server 100, or it can be performed automatically by the primary server 100 upon the specified date and simply reported back to the insurance server 130.

Once information about the benefits available to each member are properly defined in the database, the system 10 is able to process transactions for that member. In step 750, a membership identifier 112 is provided to the member for use in conducting those transactions. As explained previously, the member identifier 112 can be provided through a printed card or through a visible user interface 310 created by an app 302 on the member computing device 110. In other embodiments, a radio frequency signal is used to share the member identifier, such as through an NFC connection between the member computing device 110 and the provider computing device 120.

At step 760, the system 10 ensures that the providers are given a provider identifier 330 so that they can also conduct transactions using the system. In addition, software is provided for use by, or at the provider computing device 120 for interacting with the primary server 100. This software could be an add-on or plug-in that interacts with a point-of-sale software used at the provider computing device 120. Alternatively, this could be a specialized app whose sole function is to communicate with the primary server 100. A browser interface could also be provided to the provider computing device 120, such that this device 120 need only access a web page provided by the primary server 100 in order to communicate.

The method 700 then ends at step 770, indicating that these set-up steps are complete.

Transaction/Adjudication Method 800

Figure 8:
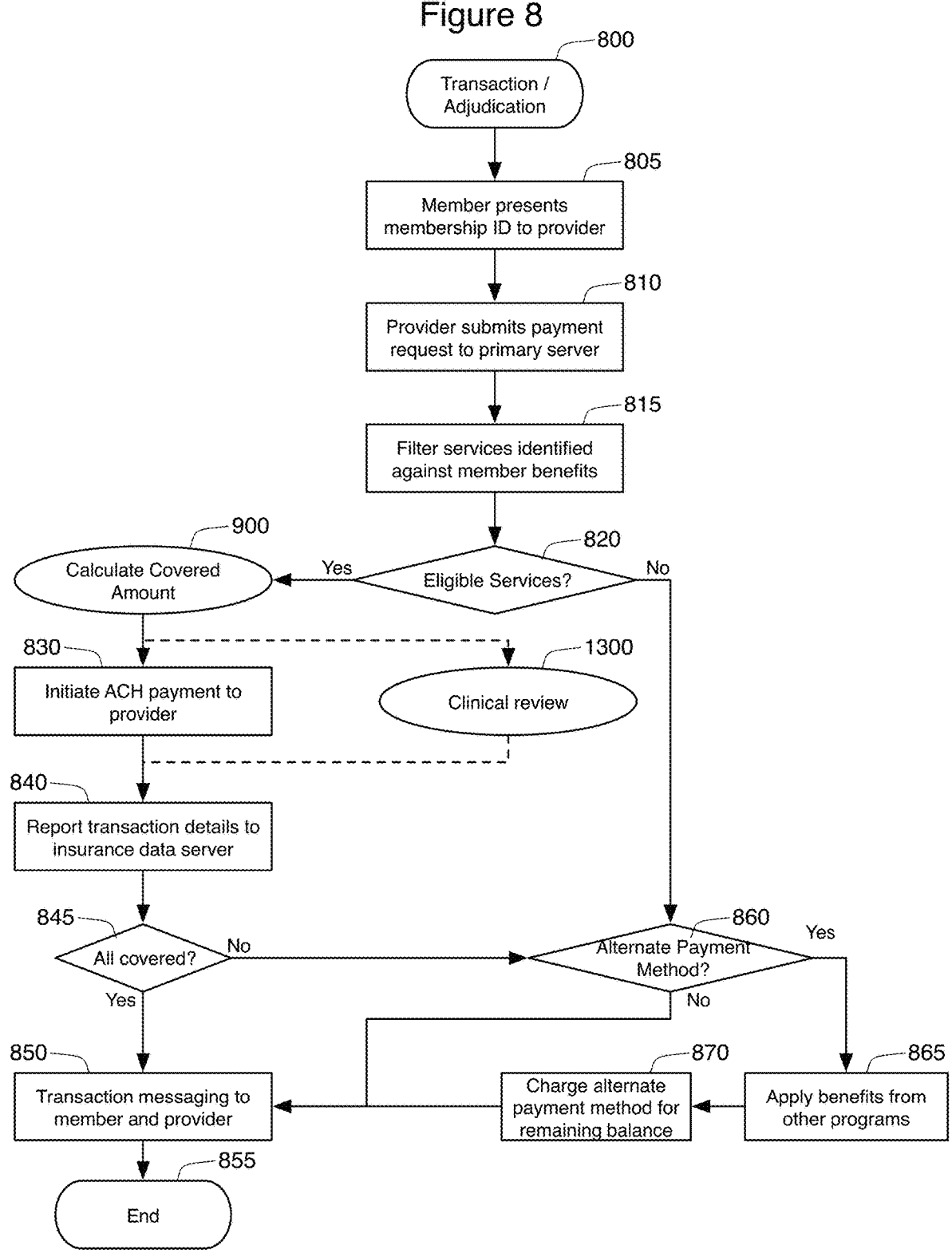
FIG. 8 is a flow diagram showing transaction processing.

FIG. 8 shows a flow chart for performing a payment/adjudication method 800, similar to that described in connection with FIG. 4. The method begins at step 805, when a member presents their member ID 112 to the provider. At step 810, the provider then uses their provider computing device 120 to submit a payment request 400 containing that member ID 112, their provider ID 330, and procedure identifying information 340 to the primary server 100.

At step 815, a filtering process is performed on the services presented in the payment request 400. In some embodiments, multiple services and/or products are presented in the payment request 400. Not all of the listed services and products will be eligible for payment/reimbursements through system 10. Step 815 analyzes the listed services and products to identify the eligible services and products. In some embodiments, this filtering takes place at the primary server 100. In other embodiments, the provider computing device 120 operates similarly to a point of sale device. A list of eligible services can be downloaded to the provider computing device 120 such that this device 120 is able to perform this filtering process. This list would take the form of an approved product or service list (or APL), such as those described in the incorporated patent applications. The filtering of the service list in this matter reduces the amount of data flowing through the network, and therefore improves the efficiency of the data communications between the components of system 10.

Step 820 determines which services are eligible based on the filtering of step 815 and sends eligible services to method 900 (shown in FIG. 9) to determine the covered amount of reimbursement to be provided through the system. Each of the eligible services in the payment request 400 are analyzed in order to determine the covered amounts for all of the services presented.

Figure 9:
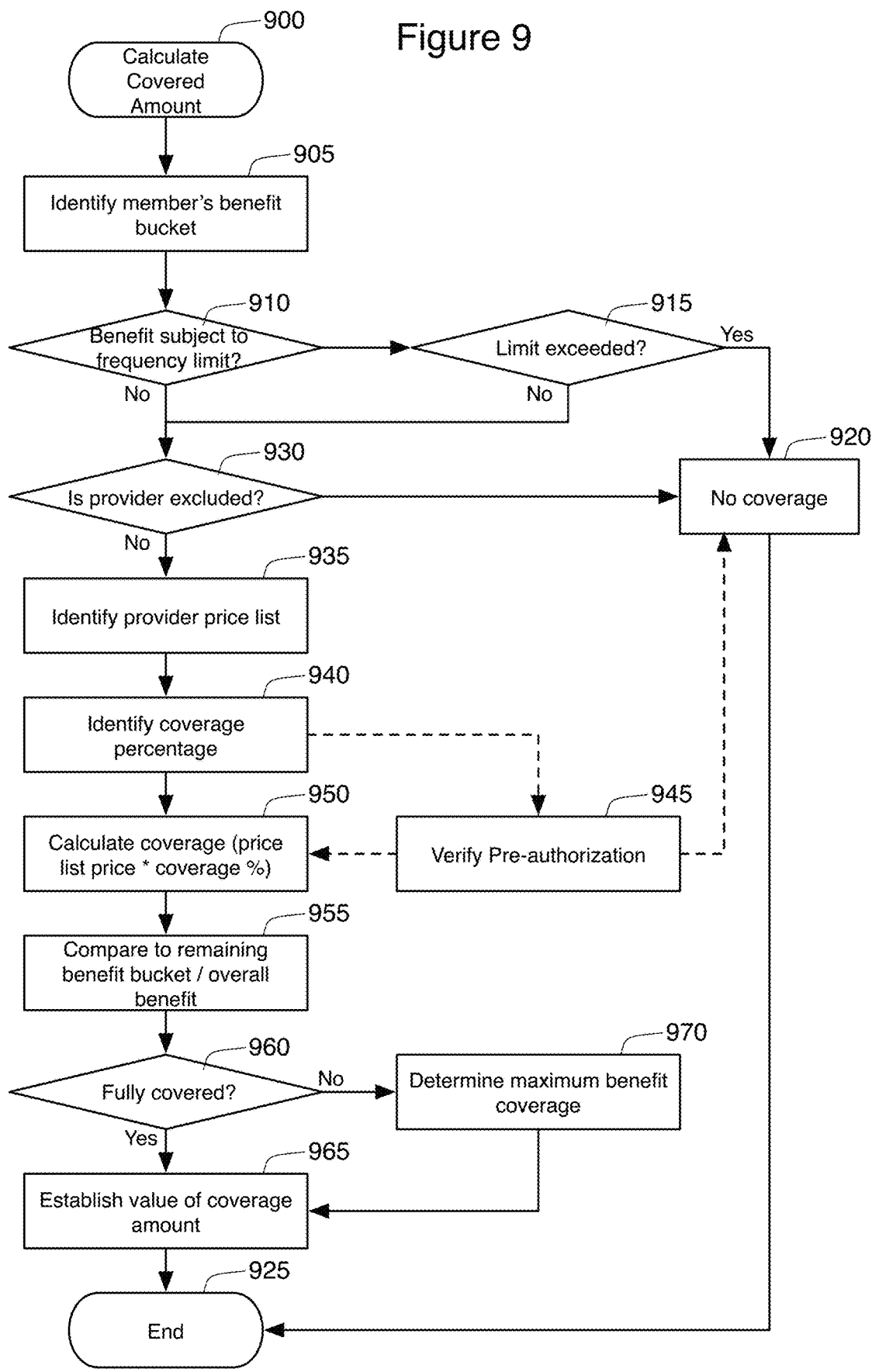
FIG. 9 is a flow diagram showing a method for calculating covered amounts.

As shown in FIG. 9, the method 900 for determining the covered amount starts at step 905 by identifying the benefit bucket 106 for this member and for this service. The benefit bucket 106 effectively identifies the rules/restrictions for this benefit category for the user and reflects the price list 135 applicable to the requesting provider. The benefit buckets 106 are simply the collection of data that provides this information, with the conceptual description of a "bucket" reflecting that fact that a member will have a variety of buckets, each of which apply to a different service, and each of which may be full (has the full amount of benefits remaining), empty (all benefits have been used), or in between. In other embodiments, the "bucket" tracks only the amount of benefits remaining, with rules/restrictions for the benefit category being tracked elsewhere in the primary data.

Step 910 determines whether the benefit defined by the benefit bucket 106 is subject to a frequency limit (such as only one crown being reimbursable for a single tooth every two years). If so, step 915 determines whether or not this frequency limit has been exceeded. If so, there is no coverage for this service, as determined by step 920, and the method will end at step 925.

If the frequency limit has not been exceeded, then step 930 determines whether this provider is excluded in some fashion. Past actions of a provider may exclude them from participating in the system 10. Alternatively, some providers may accept "out of network" payments and the associated restrictions that may be applied to such payments, while other providers will refuse any associated restrictions and be excluded. Whatever the context, if a provider is considered "excluded" by step 930, then no coverage will be provided for this service as indicated by step 920 and the method will end 925.

If step 930 determines that the provider is not excluded, step 935 determines the price list for the provider that is applicable to this service. This can be determined by examining the shadow data 104 maintained by the primary server 100. Technically, the price on the price list 135 for this service may already be bundled into the benefit bucket 106 for the service. If the benefit bucket 106 does not identify an agreed upon price for the service for this provider, then the price list for this provider is identified and examined.

Once the agreed upon price for the service category is determined, the system 10 determines at step 940 the identified coverage percentage (such as by examining the details of the benefit provided by the benefit bucket 106). For instance, an insurer may pay 50% of the agreed upon cost for a new crown.

Figure 12:
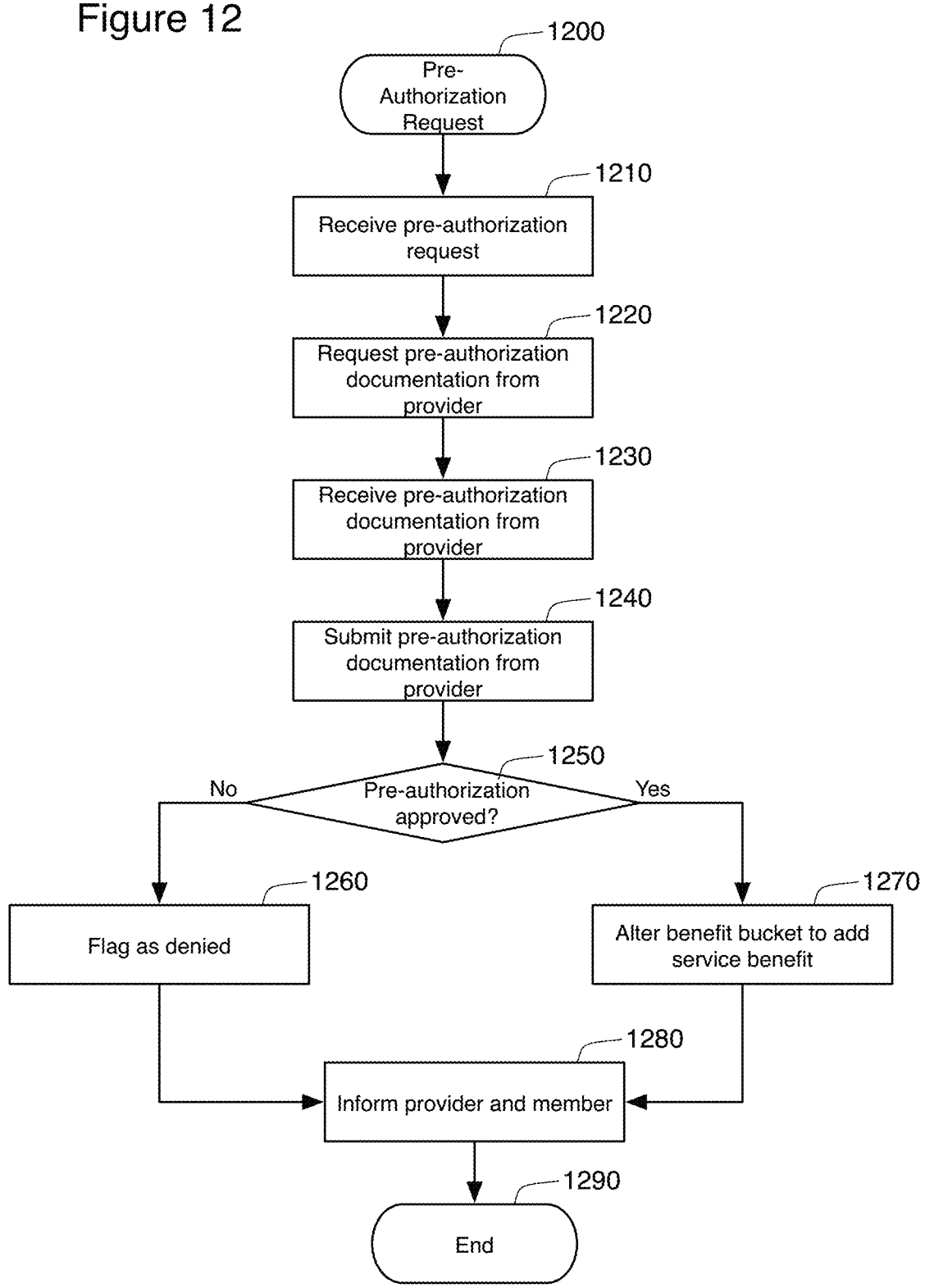
FIG. 12 is a flow diagram showing the processing of pre-authorization requests.

Some services require pre-authorization. If pre-authorization is required, step 945 will verify that the authorization data 109 indicates that the proper pre-authorization has been completed. The process for performing pre-authorizations is described below in connection with FIG. 12. If the required pre-authorization has not be given, then no coverage is provided at step 920. If the necessary pre-authorization exists, or if pre-authorization is not required, then step 950 calculates the coverage amount by multiplying the price in the price list against the coverage percentage.

At step 955, the calculated coverage is compared to the remaining benefits in the bucket 106 associated with this service category and against an overall benefit bucket that applies for all benefits provided to this member in a given year (or other time frame). If step 960 indicates that sufficient benefits exist in both buckets for this calculated amount, this establishes the amount of coverage at step 965, at method 900 ends at step 925. If there are insufficient funds in one or both of these buckets, step 970 caps the coverage amount at the smallest of the remaining buckets, and this amount gets established as the coverage amount in step 965.

Returning now to FIG. 8, after the covered amount is calculated through method 900, step 830 initiates an ACH payment to the provider's account 420 from the payment account 430. This is, of course, assuming that some amount of coverage was calculated by method 900. If no coverage was found in method 900, no payment would be made. In some instances, payment to a provider will be subject to clinical review. This is handled by method 1200, described in connection with FIG. 12 below.

At step 840, the coverage amount and the amount paid to the provider are transmitted to the insurance server 130 for recording in the insurance data 138. Step 845 determines whether the entire cost for the service(s) identified by the price list has been covered by the calculated coverage amount. If so, then step 850 simply provides messaging to the member device 110 and the provider device 120 that the entire amount for the service(s) has been paid for through step 830. The method 800 then ends at step 850.

If the entire amount is not covered, step 860 will determine whether or not alternate payment methods are provided by the system 10. In FIG. 3, the member device 110 was shown to include a digital wallet 306, which defines alternative methods for payment. In other circumstance, the member may directly arrange for alternative payment methods to be associated with their data in the system 10. If no alternative payment methods are known for the member (or if the system 10 does not provide for alternative payment methods), then 850 simply reports that partial payment has been provided and the provider computing device 120 will know that it should receive payment for the remaining portion of the fee directly from the member.

If alternative payments are provided and available, then step 865 will first determine whether other programs, such as programs 510-570 in system 500, are available that might pay, or partially pay, for these services. For instance, government programs 560 may help pay a member's "co-pay", or an employer might contribute a portion of these costs directly to the member through an employer sponsored program 570. Furthermore, discount benefits 550 might be applicable through a manufacturer or service provider. As shown in FIG. 8, step 865 applies these benefits from other programs 51-570 before step 870 charges an alternative payment method for the remaining balance. The alternative payment method may be a banking account associated with the member, a credit card, a healthcare savings account, or other similar account that can provide payment. Assuming steps 865 and 870 can together pay the remaining balance, the payment for the transaction will be complete. Step 850 will then send a message to that effect to the member computing device 110 and the provider computing device 120. It is also possible that only a portion of the remaining balance is paid through steps 865 and 870. As explained above, the provider computing device 120 may be operating as a point of sale device, allowing the POS device to complete the sales transaction through the payments provided by the system. Note also that even if step 820 finds that no eligible services 820 are available for payments through step 830, alternative payment methods 860-870 can still be applied.

Alternative Adjudication and Request Processing

System 500 shown in FIG. 5 assumes the presence of both a dental insurance server #1 502 and a dental insurance server #2 510. These may be operated by different entities and may have different requirements and desires for adjudication (the determination as to the coverage level under the insurance policy for the submitted services) and payment. Alternatively, a single insurance server 130 may have different requirements for different subsets of members, or for different types of insurance products.

Figure 10:
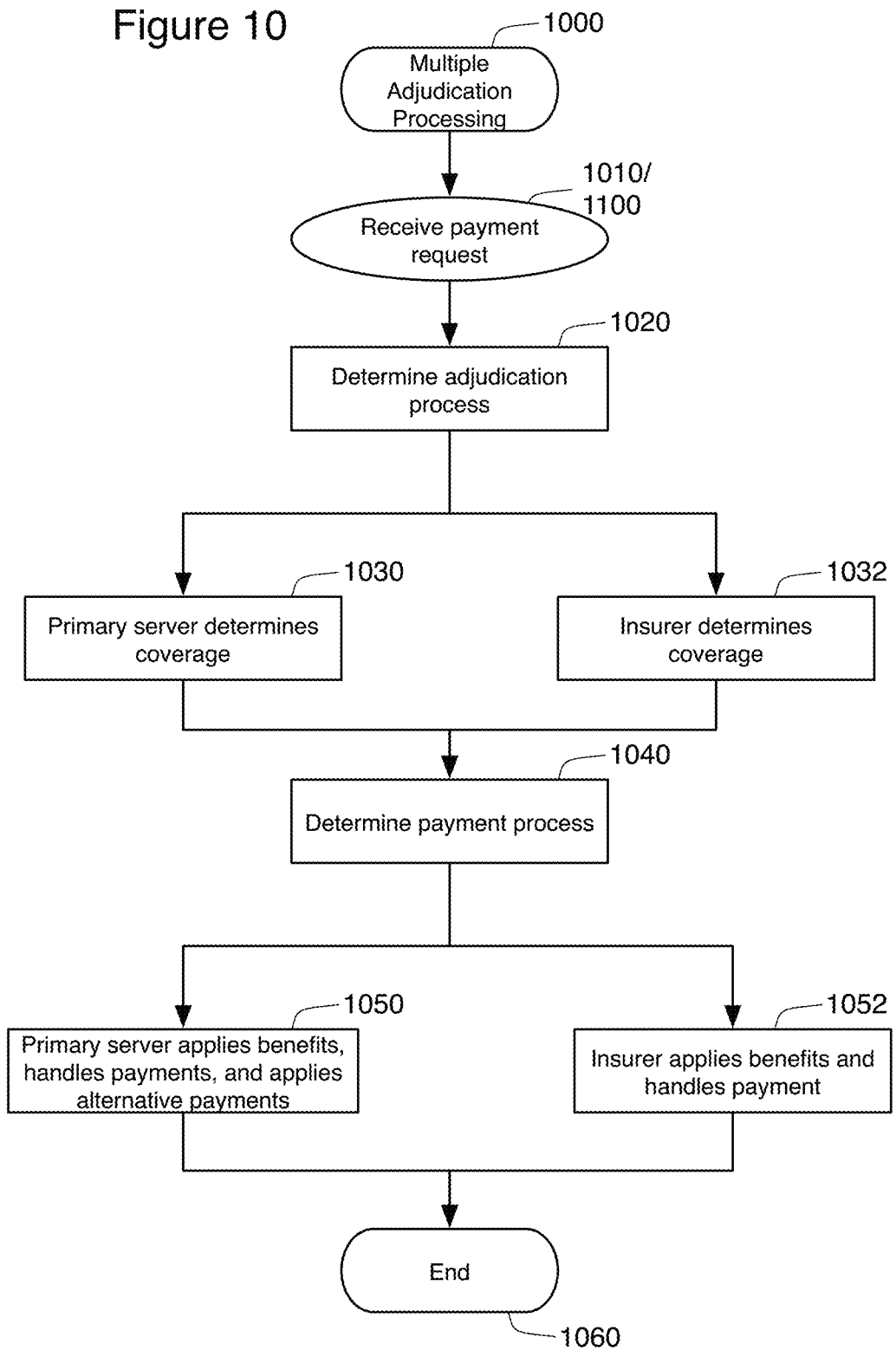
FIG. 10 is a flow diagram showing multiple methods for adjudication processing.

FIG. 10 shows a method 1000 that is applicable for an alternative embodiment of the present invention that handles multiple methods for adjudication and/or payment. Method 1000 starts with step 1010, in which a payment request 400 is received from a provider computing device 120. While method 800 assumes that the primary server will handle all adjudication of this request 400, method 1000 allows for alternatives depending upon the details of the request 400. Step 1020 is responsible for determining what entity will handle the adjudication processing. One option is that the primary server 100 handles the process, which is indicated by step 1030. The primary server 100 then determines the coverage and coverage amount for the service(s) specified in the payment request 400. The process for determining this amount is described above in connection with FIG. 9.

The other option that can be selected based on the details of the payment request 400 (such as the insurance plan, the provider, or the insurer itself) is to have the insurer adjudicate the payment request, which is shown at step 1032. The insurer then uses the insurance server 130 (or other computer system) and the insurance data 138 to adjudicate the payment request 400 and determine the coverage amount.

Of course, whether the primary server or the insurer adjudicates the payment request 400, the other party will be informed of the adjudication results. At step 1040, it is necessary to determine who handles the payment processing to the provider. This again can be determined by the details of the payment request. If the primary server 100 is selected, the primary server 100 at step 1050 applies the benefits and handles payments pursuant to the insurance plan and remaining benefits, and also applies alternative payments, as described above in connection with FIG. 8 (including informing the insurance server 130 of the payment transaction). If the insurer is selected, the insurance server 130 (or other system provided by the insurer) handles this payment at step 1052 in the manner traditional for that insurer, and the primary server 100 is informed of the transaction. The method 1000 then ends at step 1060.

Figure 11:
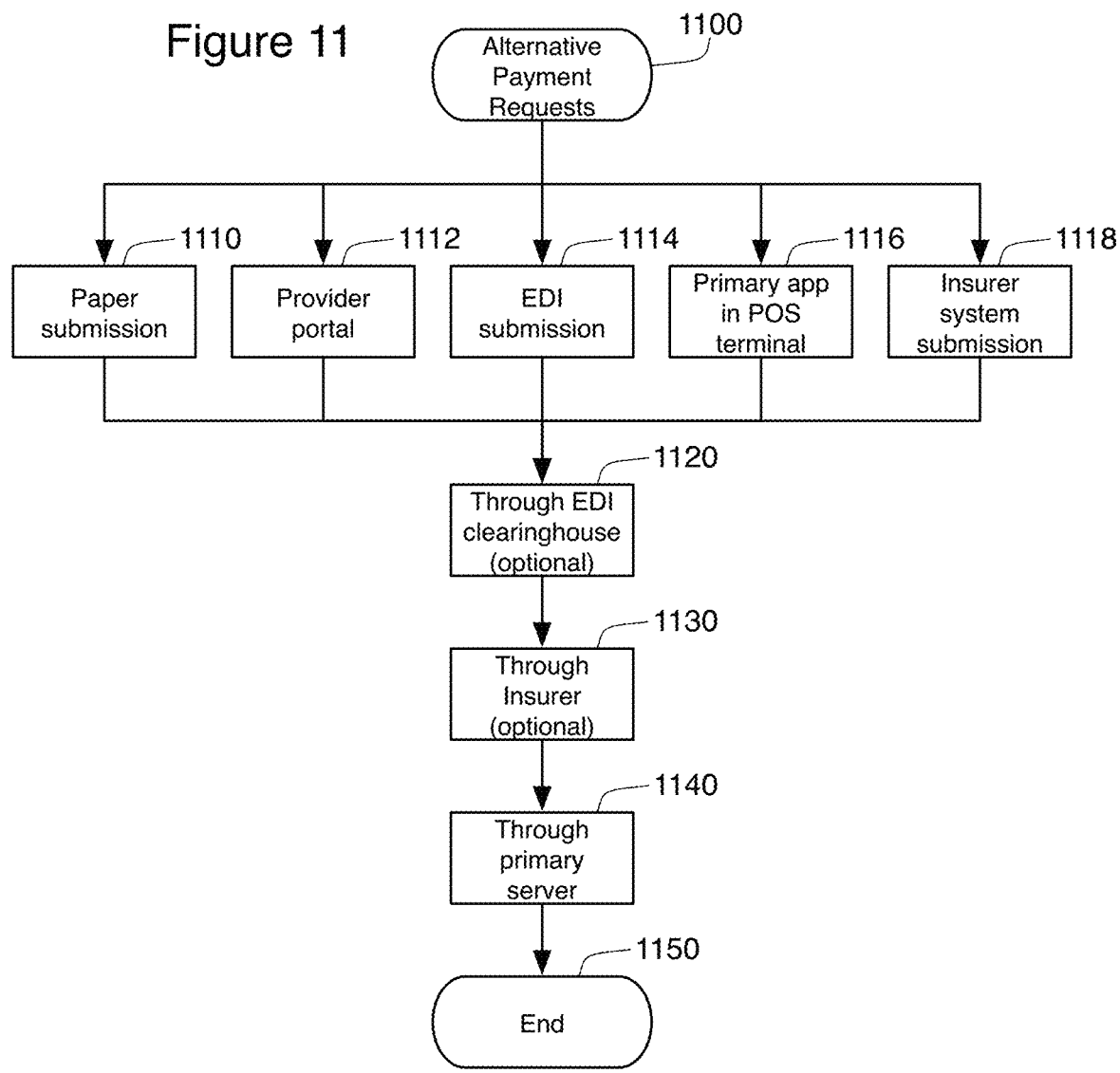
FIG. 11 is a flow diagram showing multiple methods for receiving payment requests.

As shown in FIG. 10, step 1010 can be performed by method 1100, which is a method for receiving the payment request 400 and is shown in FIG. 11. As shown in this figure, the original submission of the payment request 400 can be through a paper submission 1110, through a provider portal 1112 such as a website interface to the primary server 100, through a submission to an EDI clearinghouse, through an app 112 that communicates directly with the primary server 100 operating in the provider computing device 120, or through an insurer system submission process 1118 that communicates directly with the insurance server 130. All of these types of submissions can enter into the processes described herein.

At step 1120, it is possible to submit the received submission 400 from steps 1110, 1112, 1116, and 1118 to an EDI clearinghouse. Of course, submissions 1114 already are within the clearinghouse. An EDI clearinghouse is a service designed to receive payment submissions and "clean them" before submission to an insurer. Such services may be beneficial even when the payment request 400 is being handled by the primary server 100. The submissions 400 received through steps 1110, 1112, 1114, and 1116 can also pass through the insurance server 130, as shown through step 1130. The insurer may desire to have all payment submissions 400 pass through its systems before being handled by the primary server 100. This type of requirement is not necessary to handle the processing of the payment submissions 400 (as explained above), but may be a business requirement of a particular insurer. Finally, the submissions are received by the primary server at step 1140 for processing as described herein.

Pre-Authorization and Clinical Review

Figure 26:
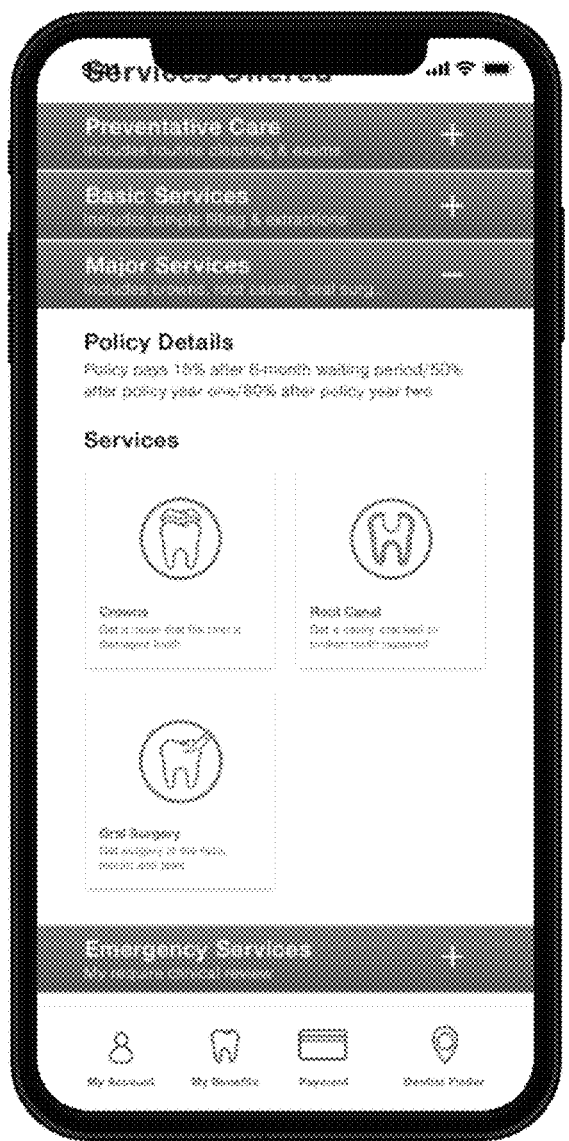
FIG. 26 shows a user interface 2600 for one embodiment of the present invention.
Figure 27:
FIG. 27 shows a user interface 2700 for one embodiment of the present invention.

As explained above in connection with FIG. 9, step 945 determines whether the necessary pre-authorization has been completed before authorizing payments for services that require this step. Pre-authorization means that an insurance company will examine a request for service before the service is performed in order to ensure that the service will be eligible for coverage under the insurance plan. In the context of dental insurance, pre-authorization is typically required for major dental services. FIG. 26 shows a user interface 2600 provided when a member requests information about major services provided by a provider. If the member is interested in having a crown put on a tooth, they can select the crown service in interface 2600 to get the detailed information interface 2700 shown in FIG. 27. The amount of insurance coverage is shown, but FIG. 27 also includes a button labeled "Get Pre-Authorization Now." This indicates that the service requires pre-authorization, and that the member herself can request that the pre-authorization process begin.

Once this button is pressed, process 1200 shown is performed. The first step 1210 in this process 1200 is the receipt of this pre-authorization request from the user interface 2700. The primary server 100 informs the provider computing device 120 that the pre-authorization process has begun and that documentation supporting the need for this service needs to be provided to the insurer. This notification and the necessary forms are transmitted in step 1220. The primary server 100 also informs the insurance server 130 that the pre-authorization has begun. The primary server 100 then awaits the documentation, which is received from the provider computing device 120 at step 1230.

At step 1240, the received documentation from the provider is submitted to the insurance server 130. The primary server 100 then awaits a determination notification from the insurance server 130. When it is received, the primary server 100 determines whether the pre-authorization was approved or denied at step 1250. If denied, the service is flagged as denied in primary data 102 at step 1260. If authorized, the benefit bucket for this this service is altered to include the authorized service at step 1270. In this way, step 945 will be able to see that the service is authorized and allow payment for the service. Regardless of whether the pre-authorization request is approved or denied, the provider and the member are informed at step 1280, and the process 1200 ends at step 1290.

During this method 1200, the primary server 100 is kept informed of the process so that it can inform the member computing device 110. For instance, if the member is still awaiting the result of the pre-authorization process after one week, they can use the app on device 110 to request update information from the primary server 100, which might inform them that the dental provider has yet to provide the necessary documentation.

Figure 13:
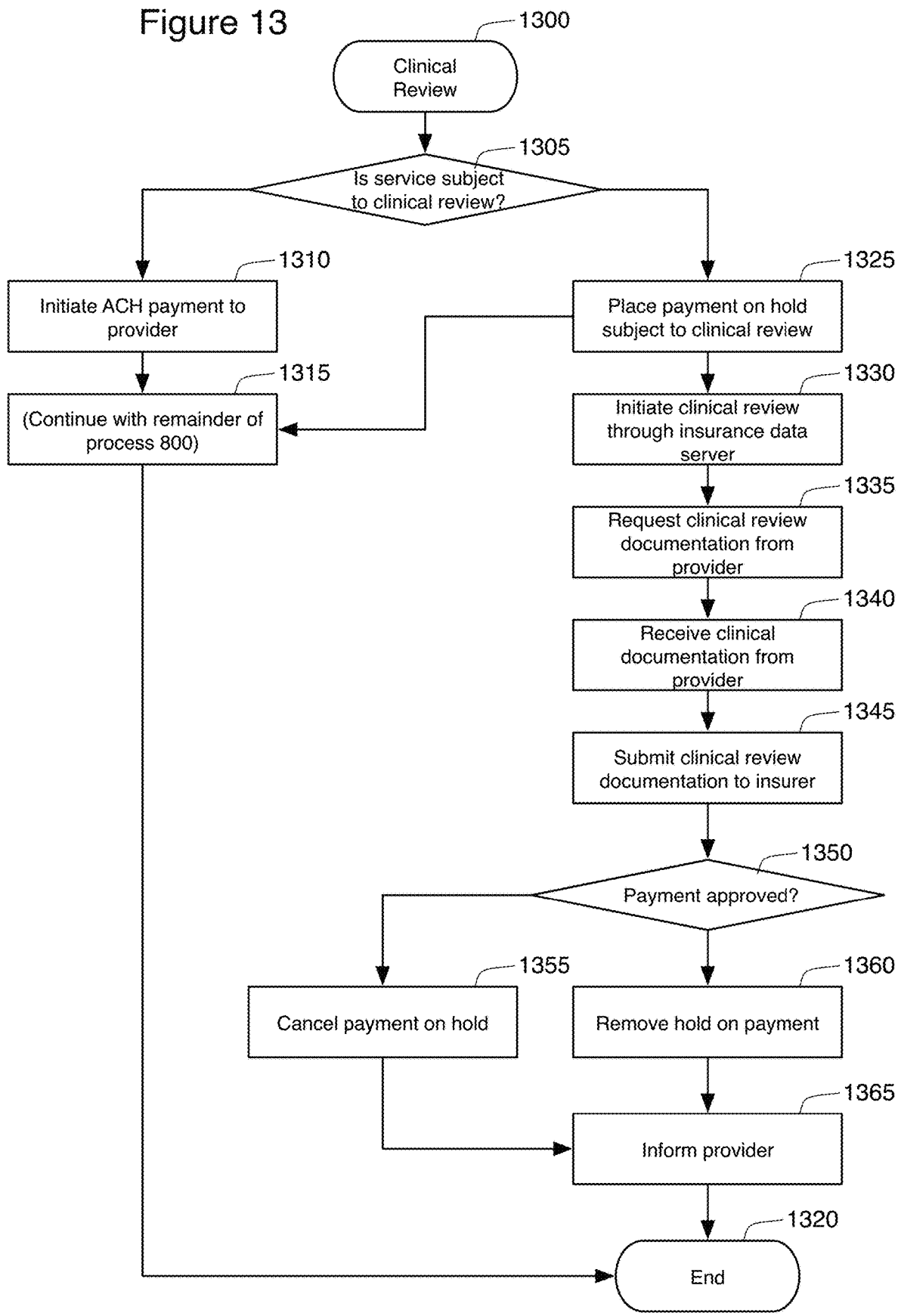
FIG. 13 is a flow diagram showing the processing of clinical reviews.

Finally, FIG. 13 shows the process 1300 for a clinical review. Clinical review usually occurs after services are performed and the request for payment 400 has been initiated. In some circumstances, the primary server 100 can itself determine that the services require clinical review.

As shown in FIG. 8, the clinical review process 1300 bypasses automatic ACH payment step 830 after the amount covered is determined by process 900. If clinical review processing 1300 is utilized in method 800, the first step 1305 is to determine whether the service being analyzed is actually subject to clinical review. If it is not, step 1310 performs the ACH payment to the provider that was bypassed at step 830, and then the remainder of process 800 is performed (as indicated by step 1315 in process 1300). The method 1300 then ends at step 1320.

If clinical review is applicable to the service, step 1325 puts a hold on the ACH payment to the processor. At this point, the method continues in two directions. First, the remainder of process 800 is continued at step 1315. This allows the collection of the remaining portion of the cost for the service through the alternative payment process of steps 860-870. Thus, if a $1,000 procedure was covered at a 60% coverage percentage, the provider would normally be paid $600, and the remaining $400 could be collected through steps 860-870. If the procedure were subject to clinical review, the provider would not collect the $600 until after the clinical review due to the hold put in place at step 1325. Nonetheless, the provider could collect the $400 through the alternate payment mechanisms (steps 860 to 870) or through mechanisms outside of system 10.

The second continuation of the method after step 1325 is at step 1330, which informs the insurance server 130 to trigger clinical review. As was the case with pre-authorization, documentation is requested from the provider computing device 120 at step 1335. At step 1340, this documentation is received by the primary server 100 and then submitted to the insurance server 130 at step 1345.

The primary server 100 then awaits the result of the clinical review. As with pre-authorization, the primary server 100 is kept informed of the process so that it can respond informatively to any queries concerning the status of the review from the provider computing device 120.

At step 1350, the decision is returned from the insurance server 130 to the primary server 100. If the payment is denied, as determined by step 1350, the payment on hold is canceled at step 1355. If the payment is approved, the hold is removed at step 1360 and the ACH payment to the provider is made. Regardless of the decision, step 1365 will inform the provider computing device 120, and the method ends at step 1320.

One of the primary benefits of the above-described system is that the provider is able to submit the payment request 400 immediately after performing a dental service. The provider receives the member's identifier 112, makes the payment request 400, and receives the payment confirmation 410 back from the primary server in real time while the member is still at the provider's location. In some instances, the payment is made to the provider account 420 at the same time. But more important than that is the fact that the provider will immediately know how much additional payment must be received from the member. This additional amount is effectively the total cost of the service (as indicated in the agreed upon price list 135) minus the insurance benefit as determined by the primary server 100. The provider can then accept payment of this remainder amount from the member immediately. Alternatively, the system 10 can charge this remainder amount to the alternate payment method associated with the member identifier. Without system 10, the provider would submit an insurance claim to the insurer after the member has left the premises, would wait for the insurance server 130 to determine the payment amount, would receive this determination, and then would create an after-the-fact invoice that must then be mailed to the member.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A primary server for facilitating real-time exchanges between a plurality of third-party servers and a point of sale device, the primary server comprising memory and one or more processors communicatively coupled to the memory, the one or more processors configured to:
    establish communication with the plurality of third-party servers, wherein each of the plurality of third-party servers stores third-party data that has at least a first structure and is associated with a member plan for a user;
    generate, for the user, primary data having a second structure by duplicating a portion of the third-party data having the first structure into the memory that is locally accessible by the primary server without further communication with the plurality of third-party servers, wherein the primary data comprises:
        (i) shadow data indicative of a locally duplicated portion of the third-party data stored by the plurality of third-party servers; and
        (ii) a plurality of live bucket data items corresponding to the plurality of third-party servers, wherein a live bucket data item of the plurality of live bucket data items:
            (1) comprises definition data populated from a particular third-party server of the plurality of third-party servers that manages the live bucket data item, and
            (2) defines a live available benefit for a service corresponding to the live bucket data item and that is based on a plurality of user-provider interactions associated with (a) one or more provider computing devices and (b) the service for the user;
    receive, originating from the point of sale device, a payment request identifying the service, a provider identifier, and a member identifier that is linked to one or more identifiers respectively corresponding to one or more live bucket data items of the plurality of live bucket data items;
    determine, based at least in part on the shadow data and live bucket data item, that:
        (i) the service is subject to a frequency limit and that the frequency limit is not exceeded,
        (ii) a provider corresponding to the provider identifier is not excluded from payment, and
        (iii) a live available benefit for the live bucket data item is less than a reimbursement amount for the service; and
    in response to the determining:
        (i) initiate, in real time, the performance of an ACH payment (1) to a provider account associated with the provider identifier, (2) from a third-party account associated with a third-party server corresponding to the live bucket data item, and (3) in a payment amount of the live available benefit for the live bucket data item;
        (ii) reduce the live available benefit for the live bucket data item by the payment amount;
        (iii) identify an alternate payment method for the member identifier;
        (iv) initiate, in real time, a payment from the alternate payment method for the reimbursement amount minus the payment amount; and
        (v) transmit data regarding the payment request and the payment amount to the third-party server;
    initiate, through a user device, a user interface corresponding to at least a portion of the primary data for the user;
    receive, originating from the user device, a data request that identifies the live bucket data item; and
    in response to the data request, update the user interface to communicate the live available benefit for the live bucket data item, wherein the user interface is updated without communication with the third-party server.

2. The primary server of claim 1, wherein the shadow data is updated on a periodic basis and the periodic basis is daily and the live bucket data item is updated in real time.

3. The primary server of claim 1, wherein the data request is a network communication that identifies the service, the provider identifier, or the member identifier that is linked the live bucket data item.

4. A method for facilitating real-time exchanges between a plurality of third-party servers and a point of sale device, the method comprising:
    establishing, by one or more processors, communication with the plurality of third-party servers, wherein each of the plurality of third-party servers stores third-party data that has at least a first structure and is associated with a member plan for a user;
    generating, by the one or more processors and for the user, primary data having a second structure by duplicating a portion of the third-party data having the first structure into memory that is locally accessible by a primary server without further communication with the plurality of third-party servers, wherein the primary data comprises:

(i) shadow data indicative of a locally duplicated portion of the third-party data stored by the plurality of third-party servers; and
(ii) a plurality of live bucket data items corresponding to the plurality of third-party servers, wherein a live bucket data item of the plurality of live bucket data items:
(1) comprises definition data populated from a particular third-party server of the plurality of third-party servers that manages the live bucket data item, and
(2) defines a particular live available benefit for a service corresponding to the live bucket data item and that is based on a plurality of user-provider interactions associated with (a) one or more provider computing devices and (b) the service for the user;

receiving, by the one or more processors and originating from the point of sale device, a payment request identifying the service, a provider identifier for a particular provider, and a member identifier that is linked to one or more identifiers respectively corresponding to one or more live bucket data items of the plurality of live bucket data items;

determining, by the one or more processors and based at least in part on the shadow data and the live bucket data item, that:
(i) the service is subject to a frequency limit and that the frequency limit is not exceeded,
(ii) a provider corresponding to the provider identifier is not excluded from payment, and
(iii) a live available benefit for the live bucket data item is less than a reimbursement amount for the service; and in response to the determining:
(i) initiate, in real time, the performance of an ACH payment (1) to a provider account associated with the provider identifier, (2) from a third-party account associated with a third-party server corresponding to the live bucket data item, and (3) in a payment amount of the live available benefit for the live bucket data item;
(ii) reduce the live available benefit for the live bucket data item by the payment amount;
(iii) identify an alternate payment method for the member identifier;
(iv) initiate, in real time, a payment from the alternate payment method for the reimbursement amount minus the payment amount; and
(v) transmit data regarding the payment request and the payment amount to the third-party server;

initiating, through a user device, a user interface corresponding to at least a portion of the primary data for the user;

receiving, originating from the user device, a data request that identifies the live bucket data item; and in response to the data request, updating the user interface to communicate the live available benefit for the live bucket data item, wherein the user interface is updated without communication with the third-party server.

5. A computing system for facilitating real-time exchanges between a plurality of third-party servers and a point of sale device, the computing system comprising memory and one or more processors communicatively coupled to the memory, the one or more processors configured to:

establish communication with the plurality of third-party servers, wherein each of the plurality of third-party servers stores third-party data that has at least a first structure and is associated with a member plan for a user;

generate, for the user, primary data having a second structure by duplicating a portion of the third-party data having the first structure into the memory that is locally accessible by a primary server without further communication with the plurality of third-party servers, wherein the primary data comprises:
(i) shadow data indicative of a locally duplicated portion of the third-party data stored by the plurality of third-party servers; and
(ii) a plurality of live bucket data items corresponding to the plurality of third-party servers, wherein a live bucket data item of the plurality of live bucket data items:
(1) comprises definition data populated from a particular third-party server of the plurality of third-party servers that manages the live bucket data item, and
(2) defines a particular live available benefit for a service corresponding to the live bucket data item and that is based on a plurality of user-provider interactions associated with (a) one or more provider computing devices and (b) the service for the user;

receive, originating from the point of sale device, a payment request identifying the service, a provider identifier for a particular provider, and a member identifier that is linked to one or more identifiers respectively corresponding to one or more live bucket data items of the plurality of live bucket data items;

determine, based at least in part on the shadow data and the live bucket data item, that:
(i) the service is subject to a frequency limit and that the frequency limit is not exceeded,
(ii) a provider corresponding to the provider identifier is not excluded from payment, and
(iii) a live available benefit for the live bucket data item is less than a reimbursement amount for the service; and in response to the determining:
(i) initiate, in real time, the performance of an ACH payment (1) to a provider account associated with the provider identifier, (2) from a third-party account associated with a third-party server corresponding to the live bucket data item, and (3) in a payment amount of the live available benefit for the live bucket data item;
(ii) reduce the live available benefit for the live bucket data item by the payment amount;
(iii) identify an alternate payment method for the member identifier;
(iv) initiate, in real time, a payment from the alternate payment method for the reimbursement amount minus the payment amount; and
(v) transmit data regarding the payment request and the payment amount to the third-party server;

initiate, through a user device, a user interface corresponding to at least a portion of the primary data for the user;

receive, originating from the user device, a data request that identifies the live bucket data item; and in response to the data request, update the user interface to communicate the live available benefit for the live bucket data item, wherein the user interface is updated without communication with the third-party server.

\* \* \* \* \*

UNITED STATES PATENT AND TRADEMARK OFFICE
CERTIFICATE OF CORRECTION

| | |
|---|---|
| PATENT NO. | : 12,100,049 B2 |
| APPLICATION NO. | : 17/341361 |
| DATED | : September 24, 2024 |
| INVENTOR(S) | : Joseph Harold Gabler et al. |

Page 1 of 1

It is certified that error appears in the above-identified patent and that said Letters Patent is hereby corrected as shown below:

On the Title Page

In Column 1, item (73), Assignee, Line 1, delete "Soltran," and insert -- Solutran, --, therefor.

In the Claims

In Column 18, Line 51, Claim 3, delete "the" and insert -- to the --, therefor.

Signed and Sealed this
Seventeenth Day of December, 2024

Derrick Brent
*Acting Director of the United States Patent and Trademark Office*